United States Patent [19]

Shmidt et al.

[11] Patent Number: 4,790,942

[45] Date of Patent: Dec. 13, 1988

[54] FILTRATION METHOD AND APPARATUS

[75] Inventors: Iosif Shmidt, Brooklyn; Mario Badiali, Bronx, both of N.Y.

[73] Assignee: Membrex Incorporated, Garfield, N.J.

[21] Appl. No.: 61,007

[22] Filed: Jun. 10, 1987

Related U.S. Application Data

[63] Continuation of Ser. No. 684,304, Dec. 20, 1984, abandoned, which is a continuation-in-part of Ser. No. 563,319, Dec. 20, 1983, abandoned.

[51] Int. Cl.⁴ .................... B01D 13/00; B01D 33/06
[52] U.S. Cl. ................................. 210/650; 73/61 R; 210/321.63; 210/321.64; 210/321.68; 210/321.87; 210/391; 210/784; 422/101; 436/178
[58] Field of Search .................... 210/107, 247, 360.2, 210/391, 416.1, 436, 472, 650, 748, 784, 321.63, 321.64, 321.67, 321.68, 321.87; 422/101; 436/177, 178; 73/61 R

[56] References Cited

U.S. PATENT DOCUMENTS

| | | | |
|---|---|---|---|
| 1,762,560 | 6/1930 | Morton | 210/784 |
| 2,474,007 | 6/1949 | Maycock | 210/112 X |
| 2,670,849 | 3/1954 | Dunmire | 210/360.2 |
| 2,678,133 | 5/1954 | Thayer et al. | 210/297 |
| 3,092,581 | 6/1963 | Jaffee | 210/497.01 |
| 3,182,653 | 1/1980 | Bellhouse | 435/2 |
| 3,241,676 | 3/1966 | Neuville et al. | 210/360.2 |
| 3,289,467 | 12/1966 | Parker et al. | 210/97 X |
| 3,333,828 | 8/1967 | Boehme | 366/305 |
| 3,355,382 | 11/1967 | Huntington | 210/321.1 X |
| 3,396,103 | 8/1968 | Huntington | 210/321.1 X |
| 3,400,074 | 9/1968 | Grenci | 210/360.1 X |
| 3,468,423 | 9/1969 | Lepechon | 210/360.2 |
| 3,491,021 | 1/1970 | Huntington . | |
| 3,494,465 | 2/1970 | Nyrop | 210/194 |
| 3,504,801 | 4/1970 | Alexander | 210/321.1 |
| 3,567,030 | 3/1971 | Loeffler et al. | 210/321.1 |
| 3,578,175 | 5/1971 | Manjikian | 210/489 |
| 3,647,632 | 3/1972 | Johnson . | |
| 3,669,879 | 6/1972 | Berriman | 210/652 |
| 3,771,899 | 11/1973 | Brumfield . | |
| 3,797,662 | 11/1974 | Titus | 210/772 |
| 3,821,108 | 6/1974 | Manjikian | 210/321.1 X |
| 3,830,372 | 8/1974 | Manjikian | 210/321.1 |
| 3,849,305 | 11/1974 | Manjikian | 210/321.1 X |

(List continued on next page.)

FOREIGN PATENT DOCUMENTS

| | | |
|---|---|---|
| 0112152 | 6/1984 | European Pat. Off. . |
| 2251644 | 4/1973 | Fed. Rep. of Germany . |
| 2812042 | 10/1979 | Fed. Rep. of Germany . |
| 2276856 | 3/1976 | France ........... 210/321.1 |
| 0105206 | 6/1982 | Japan ............. 210/748 |
| WO85/02783 | 5/1985 | PCT Int'l Appl. . |
| WO85/04112 | 9/1985 | PCT Int'l Appl. . |
| WO86/00231 | 1/1986 | PCT Int'l Appl. . |
| WO86/01426 | 3/1986 | PCT Int'l Appl. . |
| WO86/02858 | 5/1986 | PCT Int'l Appl. . |
| WO86/06293 | 11/1986 | PCT Int'l Appl. . |
| WO88/01194 | 2/1988 | PCT Int'l Appl. . |
| 1325494 | 8/1973 | United Kingdom . |
| 1451432 | 10/1976 | United Kingdom . |
| 1480406 | 7/1977 | United Kingdom . |
| 1603746 | 11/1981 | United Kingdom . |
| 1603747 | 11/1981 | United Kingdom . |
| 2080144 | 2/1982 | United Kingdom . |

OTHER PUBLICATIONS

Kroner, Nissinen, and Ziegler, "Improved Dynamic Filtration of Microbial Suspensions," Bio/Technology, vol. 5, pp. 921,922,924,926, (Sep. 1987).

(List continued on next page.)

Primary Examiner—Richard V. Fisher
Assistant Examiner—W. Gary Jones
Attorney, Agent, or Firm—Bryan, Cave, McPheeters & McRoberts

[57] ABSTRACT

An improved method and apparatus for filtration includes an outer stationary body, an inner rotating body defining a gap with the outer body for receiving a fluid sample, the surface of one of the bodies defining the gap being a filter. The rotation of the inner body creates Taylor vortices which continuously displace occluded solute on the filter surface. The filter can be a membrane.

45 Claims, 13 Drawing Sheets

U.S. PATENT DOCUMENTS

| | | | |
|---|---|---|---|
| 3,912,624 | 10/1975 | Jennings | 210/636 |
| 4,040,965 | 8/1977 | Kohlheb | 210/297 |
| 4,043,919 | 8/1977 | Hutzler | 210/407 |
| 4,066,554 | 1/1978 | Guyer | 210/342 |
| 4,075,091 | 2/1978 | Bellhouse | 210/637 |
| 4,093,552 | 6/1978 | Guyer | 210/297 |
| 4,166,768 | 9/1979 | Tolbert . | |
| 4,184,916 | 1/1980 | Tolbert . | |
| 4,184,963 | 1/1980 | Sternberg | 210/321.87 |
| 4,204,961 | 5/1980 | Casuto . | |
| 4,222,870 | 9/1980 | Sternberg et al. | 210/639 |
| 4,230,564 | 10/1980 | Keefer | 210/652 |
| 4,231,875 | 11/1980 | Carlsson et al. | 210/321.1 X |
| 4,302,330 | 11/1981 | Casuto . | |
| 4,366,051 | 12/1982 | Fischel . | |
| 4,383,921 | 5/1983 | Bellhouse et al. | 210/321.1 |
| 4,427,552 | 1/1984 | Lieberherr . | |
| 4,599,170 | 7/1986 | Friedman . | |
| 4,657,529 | 4/1987 | Prince . | |
| 4,670,147 | 6/1987 | Schoendorfer | 210/541 |
| 4,675,106 | 6/1987 | Schoendorfer | 210/242 |
| 4,675,113 | 6/1987 | Graves | 210/635 |
| 4,713,176 | 12/1987 | Schoendorfer et al. | 210/645 |
| 4,740,313 | 4/1988 | Schoendorfer et al. | 210/651 |

OTHER PUBLICATIONS

"Scherfiltration im Ringspalt", Dissertation of Juerg Lieberherr at the Eidgenoessischen Technischen Hochschule, Zuerich, 1978, pp. 63–68, 196–200, 234.

R. Gaylor, "The Concept and Development of Rotary Modules for Reverse Osmosis and Ultrafiltration," *1st World Filtration Congress*, May 14–17, 1974, Paris, Papers Presented, pp. A10-1 to A10-7.

A. K. Turkson, *Electro-Ultrafiltration with Rotating Membrane Module*, Doctoral Thesis, Department of Chemical Engineering, McGill University, pp. x–xvii, 16–55, 64, 97–108, 111–120, 129–165, 167–170, 172–179, (1985).

Afeyan et al., "Continuous Adsorptive Extraction of Proteins," *The Winter Annual Meeting of the ASME*, Boston, Mass., Dec. 13–18, 1987, pp. 101–104.

Clonis, "Large-Scale Affinity Chromatography," *Bio/Technology*, vol. 5, pp. 1290–1293, (Dec. 1987).

Pungor et al., "Continuous Affinity-Recycle Extraction: A Novel Protein Separation Technique," *Bio/Technology*, vol. 5, pp. 604–608, (Jun. 1987).

Luong et al., "Affinity Cross-Flow Filtration for Purifying Biomolecules," *Bio/Technology*, vol. 5, pp. 564–566, (Jun. 1987).

Sussman, "Continuous Chromatography," *Chemtech*, pp. 260–264, (Apr. 1976).

Chase, "Affinity Separations Utilising Immobilised Monoclonoal Antibodies: A New Tool for the Biochemical Engineer," *Chem. Engr. Science*, vol. 39, Nos. 7/8, pp. 1099–1125, (1984).

J. A. Mikhlin and G. B. Tanny, "An Investigation of the Mechanism of Dynamic Membrane Formation on Rotating Microporous Surfaces," *J. Colloidal and Interface Science*, vol. 68, No. 1, pp. 157–162, (Jan. 1979).

A. K. Turkson, J. A. Mikhlin, and M. E. Weber, "Dynamic Membranes for Ultrafiltration," *J. Colloid and Interface Science*, vol. 101, No. 2, pp. 583–586, (Oct. 1984).

P. S. Thayer, "Spin Filter Device for Suspension Cultures," Chapter 12 in *Tissue Culture Methods and Applications*, edited by Kruse and Mo, pp. 345–351, (1973).

F. Vigo and C. Uliana, "Influence of the Vorticity at the Membrane Surface on the Performances of the Ultrafiltration Rotating Module," *Separation Science and Technology*, vol. 21, No. 4, pp. 367–381, (1986).

F. Figo, C. Uliana, and P. Lupino, "The Performance of a Rotating Module in Oily Emulsions Ultrafiltration," *Separation Science and Technology*, vol. 20, Nos. 2 and 3, pp. 213–230, (1985).

P. Himmelfarb, P. S. Thayer, and H. E. Martin, "Spin Filter Culture: The Propagation of Mammalian Cells in Suspension," *Science*, pp. 555–557, (May 1969).

Kroner and Nissinen, "Dynamic Filtration Studies with Cell Homogenates," *4th European Congress on Biotechnology 1987*, pp. 475–478, (1987).

A. K. Turkson, *Tangential Flow Electrofiltration*, Master's Thesis, Department of Chemical Engineering, McGill University, (Aug. 1980).

A. K. Turkson, *Electro-Ultrafiltration with Rotating Membrane Module*, Doctoral Thesis, Department of Chemical Engineering, McGill University, pp. i,v–ix, 1–15, 56–63,65–96,109–110,121–128,166,171,180–221,2-43–252,261–263, (1985).

W. Tobler, "Dynamic Filtration—The Engineering Concept of the Escher Wyss Pressure Filter," *Escher Wyss News*, 2/1978–1/1979, pp. 21–23.

(List continued on next page.)

OTHER PUBLICATIONS

J. Lieberherr, "Hydrodynamics of the Annular Gap Flow between Permeable Cylinder Walls," *Escher Wyss News*, 2/1978–1/1979, pp. 24–30.

J. Lieberherr, "The Vortex Cascade Column for Simultaneous Purification, Dissolution and Classification Processes," *Escher Wyss News*, ½ 1980, pp. 134–141.

P. S. Thayer, P. Himmelfarb, and D. Wayne Roberts, "Effects of Perfusion with Amethopterin on L1210 Leukemia Cells in Spin Filter Culture," *Cancer Research*, vol. 30, pp. 1709–1714, (Jun. 1970).

W. R. Tolbert, J. Feder, and R. Kimes, "Large-Scale Rotating Filter Perfusion System for High-Density Growth of Mammalian Suspension Cultures," *In Vitro*, vol. 17, pp. 885–890, (1981).

A. L. van Wezel, "Cultivation of Anchorage-Dependent Cells and Their Applications," *J. Chem. Tech. Biotechnol*, vol. 32, pp. 318–323, (1982).

B. Griffiths and B. Thornton, "Use of Microcarrier Culture for the Production of Herpes Simplex Virus (Type 2) in MRC-5 Cells," *J. Chem. Tech. Biotechnol.*, vol. 32, pp. 324–329, (1982).

Lieberherr, "Die Wirbelkaskadensäule—ein Apparat für simultane Reinigungs-, Lösungs-, und Klassierungsprozesse," *Chem-Tech.* (Heidelberg), vol. 9, pp. 599–604, (1980).

L. Friedel, "Kurzmitteilungen—Dynamische Filtration einer Pigmentsuspension auf dem Escher Wyss Druckfilter," *Chem.-Ing.-Tech.*, vol. 54, pp. 368–371, (1982).

Tobler, "Dynamic Filtration: Principle and Application of Shear Filtration in an Annular Gap," Filtech Conference 1981 Proceedings, pp. 137–145, (1981).

Rebsamen, "Fundamentals and Engineering Concept of a Pressure Filter for Dynamic Filtration," *Tech. Film Appl. Oper. Genie Chim. Colloq. Int.*, pp. 489–510, (1983).

Goldinger, Rebsamen, Brandli, and Ziegler, "Dynamic Micro- and Ultra-Filtration in Biotechnology," *Sulzer Technical Review*, (Mar. 1986), pp. 10–12.

Escher Wyss, "Test Unit Dynamic Pressure Filter," 1 page, (1982).

Sulzer Biotechnics, "Dynamic Pressure Filtration", (Bio-Pressure Filter), 2 pages, (1985).

Brock, *Membrane Filtration; A User's Guide and Reference Manual*, pp. 6–7, (1983).

Landau and Lifshitz, *Fluid Mechanics*, vol. 6, pp. 60–61, 106–111, (1959).

Rebsamen, Goldinger, Schreier, Merten, and Palfi, "Use of a Dynamic Filtration Method for Separation of Animal Cells," 9 pages, presented at 7th ESCAT Meeting held in Baden, Austria, Sep. 30 to Oct. 4, 1985.

Strong et al., "An Experimental Study of Mass Transfer in Rotating Couette Flow with Low Axial Reynolds Number", *Canadian Journal of Chemical Engineering*, 8/76, 295–298.

Hallstrom and M. Lopez—Leiva, "Description of a Rotating Ultrafiltration Module", Desalination, 24, (1978), 273–279.

Lopez-Leiva, "Ultrafiltration in a Taylor Vortex Flow", AIChE 87th Annual Mtg., Boston, Aug. 1979, 19–22.

Lopez-Leiva, in "Ultrafiltration Membranes & Applications", A. R. Cooper, Ed., Plenum Press, New York, 1980, 269–282.

Tobler, "Dynamic Filtration . . . the Escher Wyss Pressure Filter", *Filtration and Separation*, Nov./Dec. 1979, 630–632.

Tobler, ". . . Shear Filtration in an Annular Gap", *Filtration and Separation*, Jul./Aug. 1982, 329–332.

Lopez-Leiva, "Ultrafiltration at Low Degrees of Concentration Polarization: Technical Possibilities", *Desalinization*, 35, (1980), 115–128.

Sherwood, et al., "Desalination by Reverse Osmosis", *Industrial and Engineering Chemistry Fundamentals*, vol. 6, 1967, 2–12.

Grover, et al., "Development and Field Trial Evaluation of a New Reverse Osmosis Module System", 4th International *Symposium of Fresh Water From the Sea*, vol. 4, 1973, 159–169.

Gaylor, et al., "Development and Evaluation of a Rotary Reverse Osmosis Unit", 5th International *Symposium on Fresh Water from the Sea*, vol. 4, 1976, 293–300.

Schlichting, *Boundary-Layer Theory*, 7th Edition, McGraw-Hill, 1979, 525–531.

Lopez-Leiva, Doctoral Thesis, "Ultrafiltration in Rotary Annular Flow", 1979, 45–50, 55–64, and 82–84.

Lopez-Levia, et al., "Solute Adsorption as a Source of Fouling in Ultrafiltration", *The Proceedings from an International Workshop*, Tylosand, Sweden, Apr. 6–9, 1981, Lund University Press, 299–308.

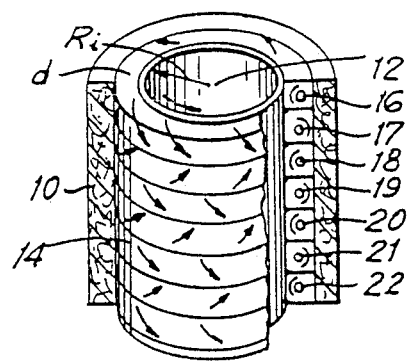
FIG. 1
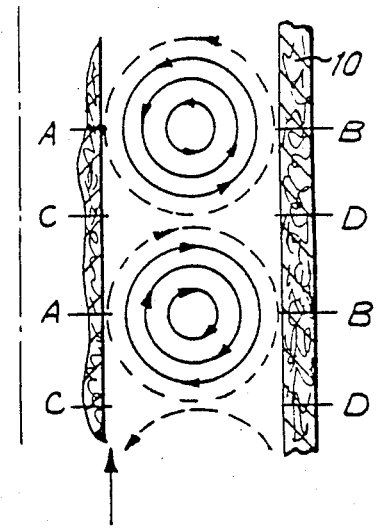
FIG. 2
FIG. 3A
FIG. 3B
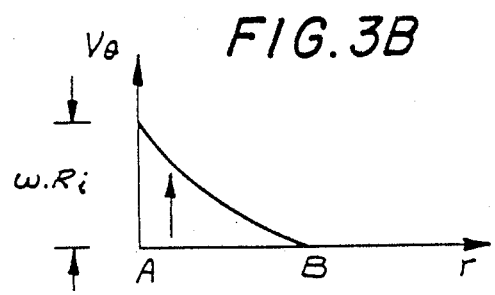
FIG. 4A
FIG. 4B
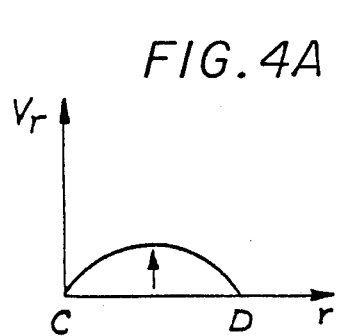
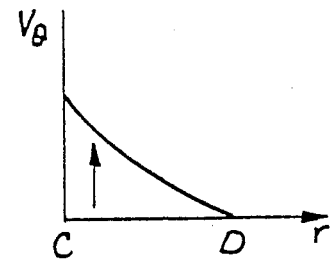

FIG. 17
FIG. 18
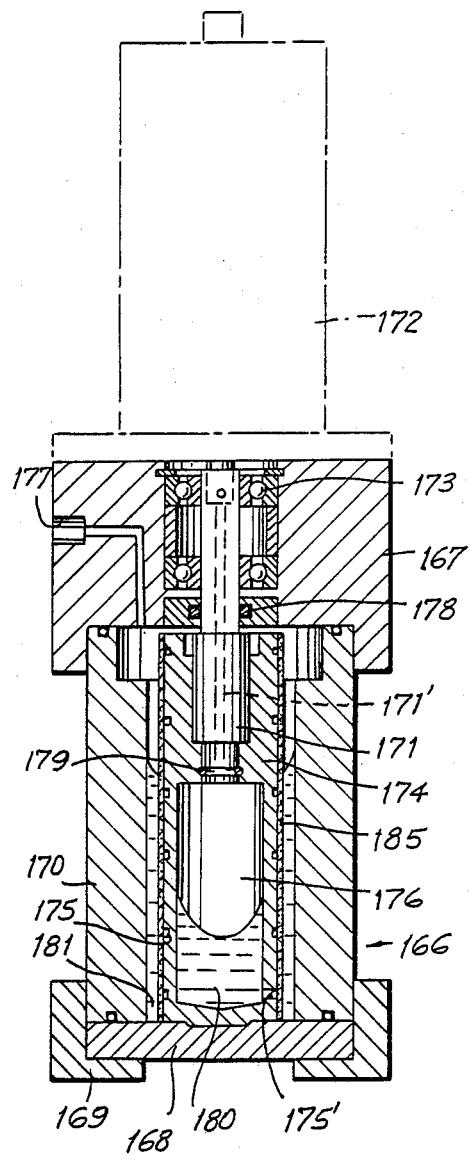
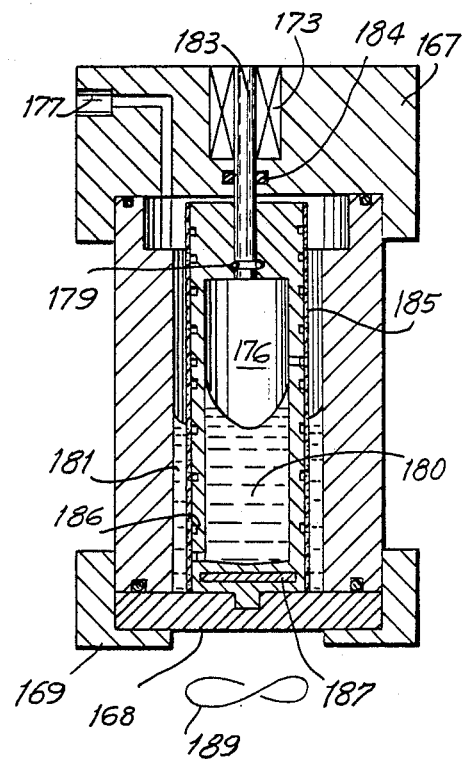

FILTRATION METHOD AND APPARATUS

This is a continuation of U.S. application Ser. No. 684,304, filed 12/20/84, which is a continuation-in-part of U.S. application Ser. No. 563,319, filed 12/20/83, both abandoned.

BACKGROUND OF THE INVENTION

The present invention in its most general aspect relates to filtration methods and apparatus for same. More particularly, it relates to filtration methods employing semi-permeable membranes as the filtration media. Such methods include reverse osmosis, ultrafiltration, dialysis, electro-dialysis, water-spitting, pervaporation and microfiltration, and depend on certain components being much more permeable through the membrane than other components. The result of such filtration methods is to separate one or more substances by retaining some within a retentate while others are separated into a permeate. In the case of electrodialysis, certain ions are much more permeable through the membrane than other solution components. The valuable fraction may be either the concentrate, the permeate or, in some instances, both, depending on the particular application. In the microfiltration of beer and the desalination of brines, the permeate is the desired product. In the preparation of pharmaceutical intermediates wherein bacterial growth is carried out in an inert but acceptable medium, the concentrate is the valuable fraction.

In its most specific aspect, the present invention is directed at overcoming the ubiquitous problem of clogging or blinding of the filter media by the accumulation of dissolved or suspended material thereon. As pointed out in detail below, in accordance with the present invention this is accomplished by a unique application of a known hydrodynamic phenomenon or principle, which is accompanied by several surprising and unexpected benefits, also set forth below.

Understanding of the invention will be facilitated by an initial consideration of filtration processes in their most general aspects. In terms of worldwide annual tonnages, mineral benefication processes are among the most prevalent of methods utilizing filtration. Typically, a mineral-bearing ore is ground to desired fineness and mixed with water and a variety of surface-active chemicals. Then, in a flotation cell, air is bubbled through the mixture, and the chemicals act to attach the non-mineral-bearing lighter particles to the bubbles, which form a froth on the surface. The concentrate and liquid, after removal of the froth, are passed over large rotating drums having coarse screens covered with a special canvas, and water is drawn out through the center of the drum with suction, and a filter cake is separated from the drum exterior, on each revolution and continuously, with a doctor blade. Fine particles do find their way into the canvas, however, and this clogs or blinds the filter, preventing the separation from occurring and requiring a back-wash operation to continue the process (see, generally, Fuerstenau, Ed., "Flotation," Am. Inst. of Min. Met. & Pet. Engs., New York, 1976).

Interestingly, the same principles that govern mineral separation in huge froth flotation plants handling millions of tons of ore also apply to separations carried out in laboratories on centiliters of a raw solution using the most sophisticated equipment. Further, the same principles apply to separations of true solutions with no particulates involved (e.g., solutions with dissolved molecules such as salts, proteins, etc.). Of course, the filter media and the process conditions are more different, but the basic principles are the same.

In conventional separations with a stationary membrane the first condition is that the liquid mixture pass over a large area of filter media in a short time. The reason for this is apparent; total flux through the membrane is proportional to its area, and separation will occur only at the liquid-media boundary, ofter called the boundary layer. This boundary layer tends to retain rejected solute species, which are retarded from returning to the bulk solution. This leads to concentration polarization and in some cases to formation of gel layers.

Of course, what has made more fine separations possible is the development of sophisticated filter materials, known generally as semi-permeable membranes. In microfiltration, for example, micro-sized pore filters can filter out the bacteria that would otherwise spoil unrefrigerated beer, replacing pasteurization and making available storage-stable "real draught" beer in markets. In reverse osmosis filtration, brines and other polluted solutions can be rendered potable (usually after several treatments in seriatim) provided the system pressure on the filter medium exceeds the osmotic pressure. Specifically, tailored plastic and cellulosic materials form the filter media in such cases. In electro-dialysis filtration, similar media are used, but an electric charge—creating an effective cathode and anode—help propel the separation. Also, therapeutic dialysis is used to purify patient's blood. However, present systems are very expensive and are of limited availability.

As noted above, the clogging or blinding of filter media is a problem at any level of filtration, insofar as transmembrane flow (flux) drops as the pores in the filter media become clogged. While scraping off a filter cake and backwashing the canvas will suffice in flotation separations, the problems multiply when one deals with finer separations. Gels (highly hydrated molecules also called flocs) can form. As solute concentration builds up at the boundary layer, chemical precipitation of colloidal-size particles can occur, a typical case being the precipitation of gypsum (hydrated calcium sulfate) from sea water. Blinding and clogging problems are compounded by the fact that semi-permeable membranes are not amenable to the rough treatment accorded drum filters in ore-dressing plants. How prior workers have addressed this problem is set forth below.

Huntington, in U.S. Pat. No. 3,355,382, discloses a reverse osmosis desalination system that rotates at over 1,000 r.p.m., providing G forces of 400, 300 and 200 on three concentric membranes. The outer shell and membranes rotate as a unit. The device does not fly apart from centrifugal rupture because of hydraulic pressure on the membranes, around 1,000-2,000 p.s.i.a. The membranes are periodically cleaned by suddenly closing a valve in the outlet line to momentarily raise the back pressure above the brine pressure, creating a "water hammer." In U.S. Pat. No. 3,396,103 of the same inventor, the cylindrical membranes are replaced by planar segments, and the resulting variation of centripetal acceleration across the segment surfaces is said to force transverse lateral circulation of brine, and lower boundary layer solute concentration.

The reverse approach is taken by Grenci in U.S. Pat. No. 3,400,074. Here, the brine is fed to the interior of the drum and the acceleration achieved by rotation is used to drive the fluid against the peripheral membrane and thus overcome the osmotic pressure. The membrane and drum rotate as a unit. This patent does not really address either the problem of membrane blinding or the structural integrity of the membrane, though in the latter instance it mentions that inlet and outlet pressures are low, but that pressure on the membrane can range from 10 to 10,000 p.s.i.

U.S. patents to Manjikian, U.S. Pat. Nos. 3,821,108, 3,830,372 and 3,849,305 disclose long, narrow-diameter cylindrical membrane units eccentrically mounted in a fixed cylinder along with mechanical stirrers, rotation of the stirrers being relied on to maintain a turbulent condition that will keep the membranes free of occluded matter. The cylindrical membrane units are displaced in a circular path about the axis of the fixed cylinder.

The British patents of Keefer, Nos. 1,603,746 and 1,603,747, disclose a first rotor which imparts an angular velocity to the feed and a second rotor, including a diffuser and the membrane, which operates at a distinct, lower speed. By encouraging free convection of the feed, concentration polarization and filter clogging is reduced.

SUMMARY OF THE INVENTION

Generally speaking, in accordance with the present invention, a method and various apparatus for filtration are provided, preferably through use of semi-permeable membranes.

In the use of semi-permeable membranes in processes such as ultrafiltration, the most difficult problem has been maintaining the membrane surface in an unclogged state. The present invention employs a membrane mounted on an inner body which rotates within a stationary outer body. The invention overcomes the clogging problem without use of such expedients as ultrasound or water hammers, by making use of a hydrodynamic phenomena known as Taylor vortices in the parent fluid in the gap between the bodies. These annular, toroidal vortices effectively maintain the membrane at a flux level near ideal, and produce other surprising results, the most important of which is effective filtration with very low energy consumption. By selecting the speed of rotation and the width of the gap, the makeup of the permeate for the selected membrane type can be determined.

Specific filtration devices may be used in carrying out this method. The devices include a stationary outer cylinder and a rotatable inner cylinder having on its surface a semi-permeable membrane. Means are provided to lead the permeate from the inside of the membrane for collection. Parent fluid is inserted within the gap between the cylinders. During rotation of the inner cylinder, the fluid is filtered through the membrane. A resulting permeate solution is then collected.

Various means are provided for collecting the permeate solutions, and for rotating the inner cylinder. Additionally, parent fluid may be circulated within device, and transmembrane flow may be enhanced by various pressure differential means, as well as use of an applied electric field. A membrane on the inner surface of the stationary outer cylinder is also possible, either alone or in conjunction with the membrane on the inner cylinder.

The surface of the cylinder supporting a membrane may be provided with a series of grooves in communication with at least one aperture providing access to the interior of the cylinder. Lands between the grooves and in registration with the periphery of the membrane support the membrane. Adhesive can be provided to secure the periphery of the membrane to the lands of the surface of the cylinder.

If the semi-permeable membrane is removed, the apparatus can function as a uniform mixing device.

It is therefore an object of the present invention to provide an improved method and apparatus for filtration through semi-permeable membranes.

A further object of the present invention is to provide a method of filtration in which the filter material is maintained in an unclogged state during normal operation and without resort to back pressures or other expedients.

Another object of the present invention is to provide a method for filtration which maintains an unclogged filter surface and is low in energy consumption.

A still further object of the invention is to provide a filtration apparatus having an active area of membrane surface corresponding to that covered by remaining solution.

Yet another object of the invention is to provide a filtration apparatus capable of self-mixing without recirculation, and which can be run to a very high level of permeate recovery.

Another object of the invention is to provide a filtration apparatus having a variable rotation speed whereby concentration of solute species in the permeate is controlled.

Still another object of the invention is to provide an improved filtration apparatus having various means for creating a pressure differential across a semipermeable membrane.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangements of parts which are adapted to effect such characteristics, all as exemplified in the following detailed disclosure, and the scope fo the invention will be indicated in the claims.

BRIEF DESCRIPTION OF DRAWINGS

For a fuller understanding of the invention, reference is had to the following description taken in connection with the accompanying drawings, in which:

FIG. 1 is a simplified schematic perspective view, in partial section, of a pair of cylinders with a fluid therebetween, illustrating phenomena utilized in the invention;

FIG. 2 is an enlarged view of a portion of FIG. 1, showing fluid flow in accordance with the phenomena utilized in the invention;

FIGS. 3A and B are plots of tangential and angular velocities between A-B in FIG. 2.

FIGS. 4A and B are plots of radial and angular velocities between C-D in FIG. 3;

FIG. 17 is a side elevational view in cross-section of a sixth embodiment for carrying out the invention, particularly adapted for small volume separation;

FIG. 18 is a side elevational view in cross-section of the small volume separator of FIG. 17, having a magnetic rotation means;

DESCRIPTION OF THE PREFERRED EMBODIMENTS

Figure 6:
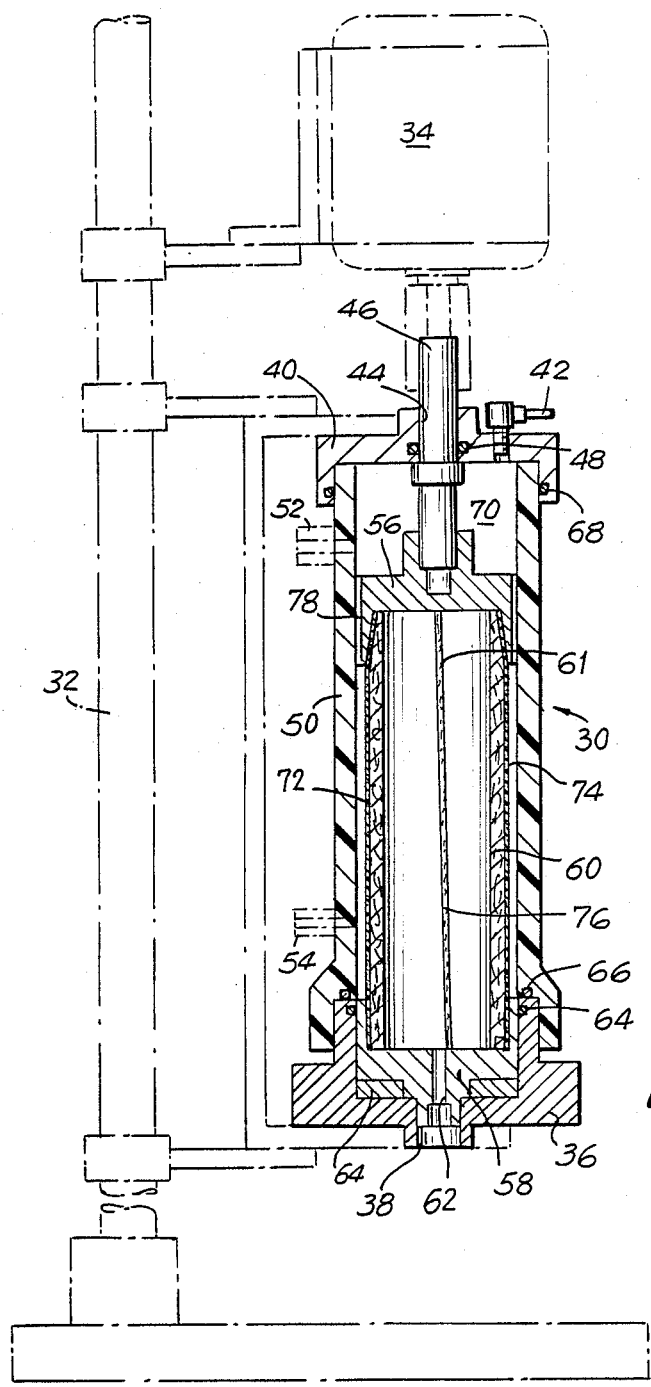
FIG. 6 is a side elevational view in cross-section of a first embodiment of an apparatus for carrying out the invention.
Figure 5:
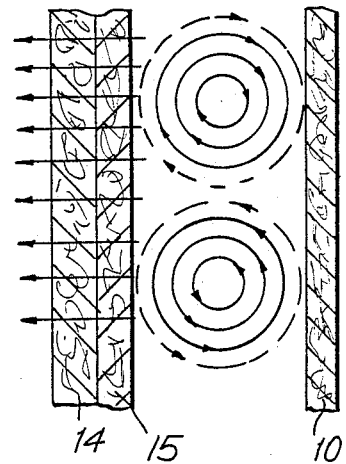
FIG. 5 is similar to FIG. 2, and shows the additional effect of permeate being removed through the membrane.

The present invention is based, at least in important part, on the discovery that a known hydrodynamic phenomena called Taylor vortices can, under properly controlled conditions, be generated in a rotating semipermeable filtration apparatus, and that, such vortices help to maintain a clean membrane surface for continued operation. A surprising aspect of the invention is the low energy consumption achieved when the methodology of the invention is practiced.

Understanding of the invention will be facilitated if the Taylor vortex phenomenon is clearly understood. As discussed by Schlichting in *Boundary-Layer Theory* 7th Ed., McGraw-Hill, 1979, instabilities in fluid flow between concentric cylinders where only the inner cylinder is in motion were first investigated by Lord Rayleigh, who performed calculations based on the assumption that the fluid was non-viscous. Taylor, using a framework of linear theory and considering viscous fluids, found that when a certain Taylor's number was exceeded, axially circumferential vortices appear, which rotate in alternately opposite directions.

Attention is directed to FIG. 1, which illustrates the phenomenon in simplified form. Specifically, an outer, stationary cylinder 10 is separated from an inner, rotating cylinder 12 of radius $R_i$ by a gap d. The gap is filled with a fluid 14. Under the proper conditions, set forth below, vortices rotating clockwise (16, 18, 20, 22) and counter-clockwise (17, 19, 21) are set up. The present invention defines the conditions whereby these vortices are maintained while continuously withdrawing fluid permeate through the inner cylinder.

Taylor determined that the minimum condition for the establishment of such vortices, defined as the Taylor number ($T_a$) was $$T_a = \frac{\mu_i d}{\nu} \sqrt{\frac{d}{R_i}} \geq 41.3 \quad \text{(Eq. 1)}$$

where $\nu$ is the kinematic viscosity of the fluid, and $\mu_i$ is the peripheral velocity of cylinder 12.

Taylor and others determined that the vortices would persist in some cases at $T_a = 400$ and in other cases up to $T_a = 1700$, but that tubulence would ensue if the Reynolds number ($R_a$) rose above about 1000.

$$R_a = \frac{\omega(2d)}{\nu},$$

where $\omega$ is axially velocity). More particularly, those skilled in hydrodynamics will appreciate that a time average velocity profile of fluid flow will generate a smooth curve, but an instantaneous velocity profile is very ragged. Thus, the Taylor vortices shown in FIG. 1 may be characterized as "main flow", but there will be a turbulent component of this, and as $T_a$ rises, this instantaneous turbulent velocity will ultimately become more important.

Curiously, insofar as is known, until the present invention, the only applications for this phenomena involved the lubrication of journal bearings and the air cooling of electric generators.

Understanding the invention as applied to filtration is facilitated by a more detailed consideration of an individual vortex between an inner wall 12 and an outer wall 10, and attention is directed to FIG. 2, where the points A, B denote positions on the respective inner and outer walls opposite the center of a vortex, and points C, D denote positions between a pair of vortices. Using cylindrical coordinates, $v_z$=tangential velocity, $v_r$=radial velocity and $V_0$=angular velocity, it can be seen that $v_z$ describes a sine wave between points A and B, there being zero tangential velocity at the center of the torus, as FIG. 3A illustrates. For a counter-rotating torus, the curve is reversed. The radial velocity from C to D describes an arc, as shown in FIG. 4A.

The important fact here is that the shear stresses due to tangential velocity, $v_z$, at one point A are in one direction and at the next point A are in the opposite direction. In a filtration device, the inner wall 12 is a semipermeable membrane and, because there is a net axial velocity due to the feeding and removal of permeate and concentrate, the individual vortices assume what appears to be a helical shape and move from the inlet to the outlet. Thus, the surface of the membrane is continuously "scoured" by the solution itself, and particulates, gels and colloids which would otherwise collect thereon are maintained in the solution.

The effect of suction through the membrane on the vortices is actually not large, even though it is the cause of concentration polarization. This is because the velocity of the suction, defined as volumetric flux per unit area of membrane per unit of time, is small compared to the linear velocity created by the rotating cylinder.

One aspect of the invention is the discovery that, when the conditions for establishing the Taylor vortices are met, the filtration can proceed at quite nominal pressures and the high pressures normally associated with these procedures are avoided, which is important in large-scale separations. However, in many separations high pressures will be preferred.

Comparing the torque required for ideal laminar flow between inner rotating and outer stationary concentric cylinders (see Bird et al. *Transport Phenomena*, John Wiley & Sons 1960), and the torque required for vortices (see Taylor, "Fluid Friction Between Rotating Cylinders," Proc. Roy. Soc., London, 1932), the latter generally is about 2-3 times greater, because of energy transfer from the primary (axial) to the secondary (vortex) flow. However, in general, the energy required as used in conventional apparatus, is still at least an order of magnitude greater than the energy required for rotation. Again, there are instances with the present invention where ideal conditions involve high rotational energy.

Figure 7:
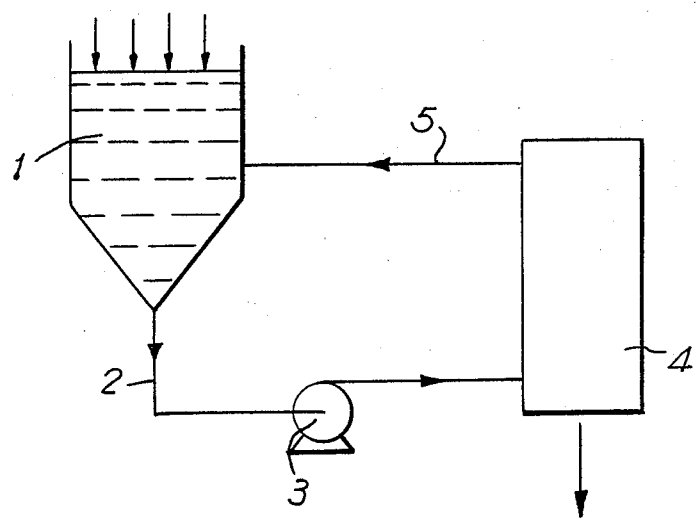
FIG. 7 is a flow diagram of a generalized system of filtration.

These problems are overcome with the apparatus of the invention, and attention is now directed to FIGS. 6 and 7.

A generalized system of filtration in accordance with the invention is shown in the flow chart of FIG. 7 and includes a pressurized feed tank 1, a feed line 2, a recirculation pump 3, an apparatus 4, and a feed return line 5.

Referring to FIG. 6, apparatus 30 is supported on a suitable rack 32 to which is also attached a drive motor 34. The stationary portions of the apparatus 30 comprise an outlet (lower) housing 36 with an outlet 38 centered in the bottom thereof, an inlet (upper) housing 40 including a gas line fitting 42, a central opening 44, to accommodate a drive shaft 46, and a suitable gasket (seal) 48. Housings 36 and 40 hold between them an outer (stationary) cylinder 50, which may be made of clear, strong plastic.

It is a feature of the invention that several interchangeable cylinders 50 may be provided, all having the same outside diameter, but each having a different inside diameter, whereby gap d may also be varied. Also, some cylinders 50 may be provided with an inlet 52 and an outlet 54, as shown in phantom in FIG. 6, so that filtrations involving recirculation of the feed can be carried out. The rotating portion of apparatus 30, in addition to drive shaft 46, comprises an upper housing 56 and a lower housing 58, supporting therebetween a porous (rotating) inner cylinder 60. A feature of cylinder 60 is that it includes a vertical slot 61 for accommodating the ends of a membrane 74 wrapped therearound, and that it be somewhat compliant, e.g., slot 61 can be opened a bit for insertion of the membrane ends 76, but will be normally sealed tightly. Also, housings 56 and 58 are sized to make a tight, friction seal against the membrane and prevent any leakage. Upper housing 56 has drive shaft 46 axially fitted into its top for rotation therewith. Lower housing 58 includes an axial opening 62, which serves as a permeate outlet, and a bushing 64 formed of a material such as Teflon selected for minimum resistance. A second gasket (seal) 64 is provided between (rotating) lower housing 58 and (stationary) housing 36, and O-rings 66 and 68 are provided between cylinder 50 and outlet housing 38 and inlet housing 40, respectively, to prevent fluid leakage.

It is important to note that the outside diameter of upper housing 56 is less than the inside diameter of outer cylinder 50, providing a fluid communication path 78 between chamber 70 at the top of the apparatus and space 72 between cylinders 50 and 60 for gas fed from gas line 42.

Adaptability of the apparatus 30 to efficient separation of small samples is clear. Even when the sample does not fill space 72, a large membrane area relative to the available fluid is presented, and gas pressure supplied via line 42 can serve to pressurize the sample and aid filtration. Separation is fast, and there is virtually no volume limit to permeate recovery.

Utility of the invention is illustrated by the following specific examples.

EXAMPLE 1

A filtration cell having a working membrane area of 390 cm$^2$ (0.42 ft$^2$) was employed, and $R_i = 3$ cm and d = 0.5 cm. A test solution (3000 ml) was 0.02% bentonite in tapwater ($\nu = 0.015$ poise). With pure tap water and 10 psi pressure the transmembrane flow was 220 ml/min (0.14 gpm/ft$^2$) or 136 $\mu$sa (gpm/ft$^2 \times 929$) (1 $\mu$sa = 10$^{-4}$ ml/cm$^2$ sec atmosphere). By rotating the membrane (inner) cylinder at 100 rpm, a $T_a = 428$ was established and the vortices appear. Pressure was again 10 psi. Results are set forth in Table I. Table I and the tables following describe various characteristics of the permeate.

TABLE I

| Time (min) | ml/min | gpm/ft$^2$ | $\mu$sa | Temp. °C. | REMARKS: |
|---|---|---|---|---|---|
| 0 | 100 | 0.06 | 62 | 24 | Permeate was clear |
| 5 | 100 | 0.06 | 62 | 25 | |
| 10 | 100 | 0.06 | 62 | | |
| 15 | 96 | 0.06 | 59 | 27 | |
| 20 | 104 | 0.065 | 64 | 20 | |
| 25 | 94 | 0.06 | 59 | | |

EXAMPLE 2

A similar solution was filtered under different conditions, where d = 0.4 cm, $R_i = 1.3$ cm, and rotational speed was 350 rpm, giving a $T_a = 705$. Results are shown in Table II.

TABLE II

| Time: (min) | gpm/ft$^2$ at 20 psi | $\mu$sa | Concentration: of the feed % | REMARKS: |
|---|---|---|---|---|
| 0 | 0.026 | 26.8 | 0.2 | Clear: Room Temp. |
| 5 | 0.020 | 21 | 0.21 | |
| 15 | 0.015 | 15.7 | 0.24 | |
| 30 | 0.012 | 12.5 | 0.28 | |
| 40 | 0.011 | 11.6 | 0.32 | |
| 50 | 0.0108 | 11.2 | 0.35 | |
| 60 | 0.0108 | 11.2 | 0.39 | |
| 70 | 0.01 | 10.3 | 0.44 | |
| 90 | 0.009 | 9.4 | 0.55 | |

EXAMPLE 3

A third test was carried out under conditions similar to those used in Example 2, except that the rotational speed was increased to 800 rpm, giving a $T_a=1616$. Results are shown in Table III.

TABLE III

| Time: (min) | gpm/ft² at 20 psi | μsa | Concentration: of the feed % | REMARKS: |
|---|---|---|---|---|
| 0 | 0.03 | 31.3 | 0.2 | Clear: Room Temp. |
| 5 | 0.024 | 24.6 | 0.2 | |
| 15 | 0.02 | 20.6 | 0.25 | |
| 30 | 0.019 | 19.2 | 0.32 | |
| 40 | 0.017 | 17.9 | 0.39 | |
| 50 | 0.017 | 17.4 | 0.49 | |
| 60 | 0.0156 | 16.1 | 0.65 | |
| 70 | 0.013 | 13.4 | 0.85 | |
| 80 | 0.014 | 14.4 | 1.25 | 84% Water recovery |

EXAMPLE 4

A second test solution was prepared using a milligram of BSA (96-99% bovine albumin) per milliliter of a buffer solution. The buffer was as follows:

| Buffer: | |
|---|---|
| 0.0167 | molar NaH₂PO₄ |
| 0.033 | molar Na₂HPO₄ |
| 0.15 | molar NaCl |
| 0.0003 | molar NaN₃ |

In this solution, $\nu=0.01$ poise. The same apparatus as in Examples 2 and 3 was used ($d=0.4$ cm, $R_i=1.3$ cm) and the test was run at 350 rpm, giving a $T_a=1057$. Results are shown in Table IV.

TABLE IV

| Time: (min) | gpm/ft² at 10 psi | μsa | BSA Conc. in permeate (mg/ml) | REMARKS: |
|---|---|---|---|---|
| 5 | 0.012 | 12 | 0.114 | Concentration of |
| 10 | 0.012 | 12 | 0.126 | buffer in permeate |
| 15 | 0.013 | 13 | 0.101 | was the same as |
| 30 | 0.013 | 13 | 0.089 | original buffer. |
| 45 | 0.012 | 12 | 0.091 | |
| 60 | 0.013 | 13 | 0.091 | |
| 75 | 0.0123 | 12.3 | 0.105 | |
| 90 | 0.0123 | 12.3 | 0.126 | |
| 100 | 0.0123 | 12.3 | 0.124 | |
| Concentrate: | | | 2.723 | |
| Overall rejection: | | | 88.6% | |

EXAMPLE 5

In this test, the results of which are reported in Table V, a different membrane was used, but the buffered albumin solution was the same, as was the apparatus. However, the test was run at 1000 rpm for two minutes ($T_a=3030$) and then dropped to 350 rpm. High-speed results reported in Table V are underlined.

TABLE V

| Time (min) | gpm/ft² at 10 psi | μsa | BSA Conc. in permeate (mg/ml) | REMARKS: |
|---|---|---|---|---|
| 0 | 0.036 | 36 | 0.085 | Concentration of |
| 2 | | | 0.073 | buffer in permeate |
| 5 | 0.030 | 30 | 0.169 | was the same as |
| 10 | 0.033 | 33 | 0.057 | original buffer. |
| 15 | 0.029 | 29 | 0.143 | |
| 20 | 0.028 | 28 | 0.143 | |
| 30 | 0.028 | 28 | 0.163 | |
| 45 | 0.033 | 33 | 0.185 | |

The important aspect of these results, compared to ordinary filtrations, is that the transmembrane flow rate remained substantially constant throughout the test, indicating no clogging or blinding of the filter. Another aspect to note is that permeate compositions can be altered constantly by using different rpm's.

In conventional membrane separation processes, as exemplified by Millipore and Amicon equipment, the membrane is located at the bottom of a vessel, the fluid is poured in, and a magnetic stirring bar provides agitation. Such a stirring bar must be kept at a distance, however small, from the membrane surface and yet have at least some of its structure submerged to obtain any reasonable mixing and for effective separation to occur. In a situation where the sample volume is small and high permeate recovery is required, the only answer is to use a very narrow vessel with a correspondingly small-area membrane at the bottom. This makes for a very slow separation.

Attention is now directed to the optimization of a filtration procedure using the method and apparatus of the invention.

The feed solution, with its own viscosity, is a "given." With the apparatus of the invention, gap d and velocity are variable. Generally, a variety of semipermeable membranes will be available but this is not always the case.

The next step is to optimise the Taylor number. With some fluids the Taylor vortices are readily observable but, if not, adding some aluminum powder is a handy expedient. This is a matter of trial. If the membrane becomes coated with a gel at $T_a=50$ but stays clear at $T_a=250$, the latter is selected.

Of course, varying gap d has a second-order effect on $T_a$, as equation 1 makes clear. It should be kept in mind that as d gets smaller (and $T_a$ decreases) the vortices will be more intense, and energy consumption will also rise.

The goals of establishing the general procedure are clear: the desired permeate, no fouling of the membrane, a good flux through the membrane, and, within these constraints, minimal energy consumption, which means the slowest rotation that is compatible with the desired permeate and flux-criteria.

Two further aspects of the invention are worthy of note. One is that, because of the significant force involved during operation, a unit such as shown in FIG. 6 can be operated vertically, horizontally or even tilted at an angle. Secondly, because of the wide range of allowable values of $T_a$, the two cylinders need not be concentric. For example, one or the other or both could be a section of a cone, or the axis of the inner cylinder could be offset from that of the outer cylinder. Even though it is known that the Taylor vortices will survive such manipulation, the effect thereof on specific separations must be determined.

Figure 8:
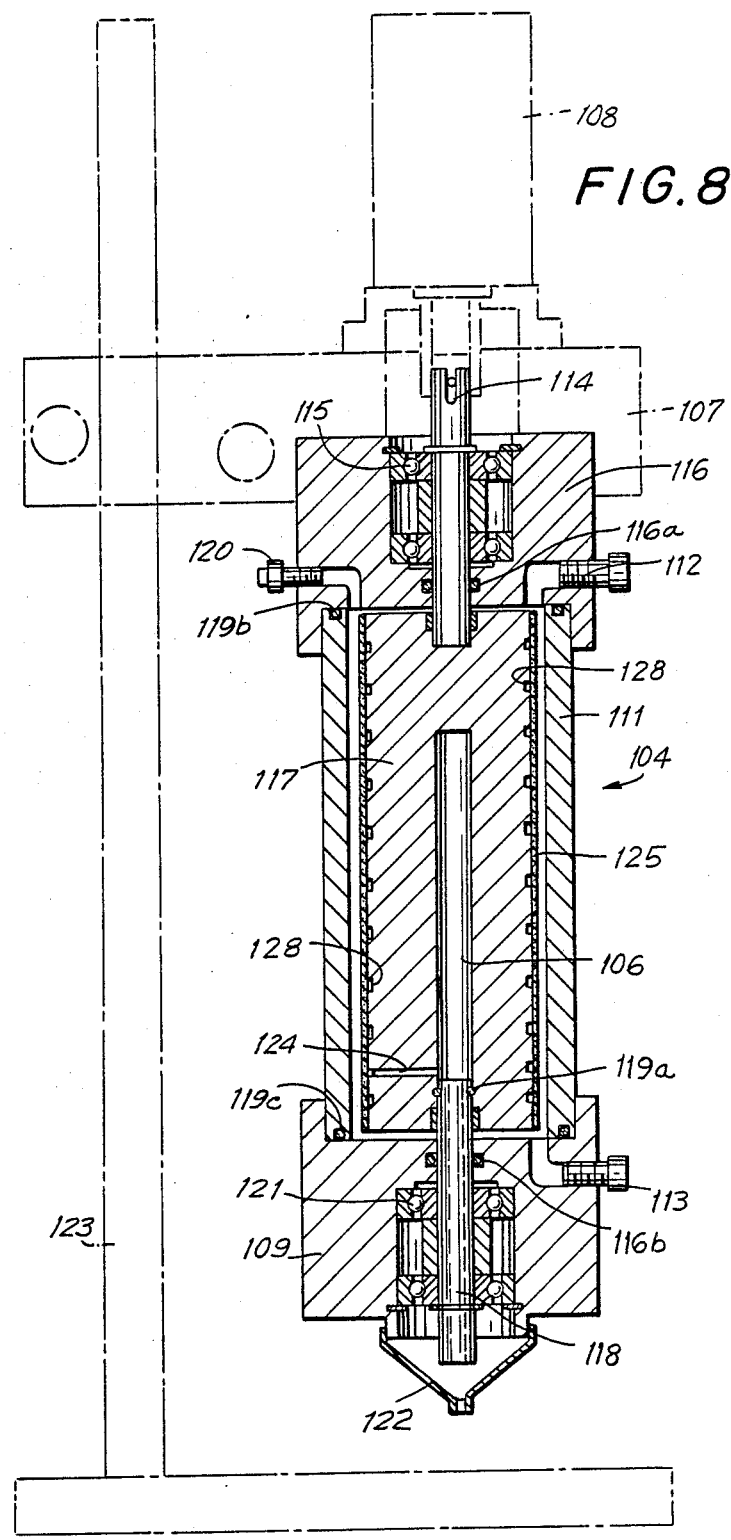
FIG. 8 is a side elevational view in cross-section of a second embodiment of an apparatus for carrying out the invention.

Referring now to FIG. 8, a second embodiment of the apparatus of the invention is disclosed. Apparatus 104 is supported by a bracket 107 and is connected to a drive motor 108. Apparatus 104 contains a lower housing 109 and an upper housing 116 which together support an outer cylinder 111. Upper housing 110 has an outlet 112. Similarly, lower housing 109 has an inlet 113. Outlet 112 and inlet 113 are used in recirculating a pressurized feed liquid. A drive shaft 114, operatively coupled to a drive motor 108, is supported in upper housing 116 by bearings 115. A dynamic seal 116a along the side of drive shaft 114 keeps the feed liquid within outer cylinder 111.

An inner cylinder 117 is formed with an outer surface having a grid of interconnecting narrow and shallow channels 128 connected by at least one radially extending hole 124 to a central bore 106 in cylinder 117. Bore 106 receives and communicates with a hollow shaft 118 supported by bearings 121 on housing 109. A membrane 125, constructed in the form of a flat sheet, is wrapped around cylinder 117, having its ends sealed and attached to cylinder 117 by means of transfer adhesive or liquid glue. Membrane 125 may also be constructed as a seamless sleeve dimensioned to fit over inner cylinder 117.

After transmembrane flow, permeate will flow by means of the grid of interconnected channels 128 in the outer wall of inner cylinder 117 into hollow shaft 118 and then through a funnel 122 into a suitable collector (not shown). A static seal 119a between hollow shaft 118 and inner cylinder 117 prevents leakage of the pressurized feed liquid into bore 106, so that the feed liquid will not mix with the permeate. A dynamic seal 116b between shaft 118 and housing 109 also helps to separate the feed liquid from the permeate. Static seals 119b and 119c between inner cylinder 117 and lower housing 109 and upper housing 116 serve to separate the feed liquid from the permeate. A pressure relief valve 120 may be provided in upper housing 110.

Figure 9:
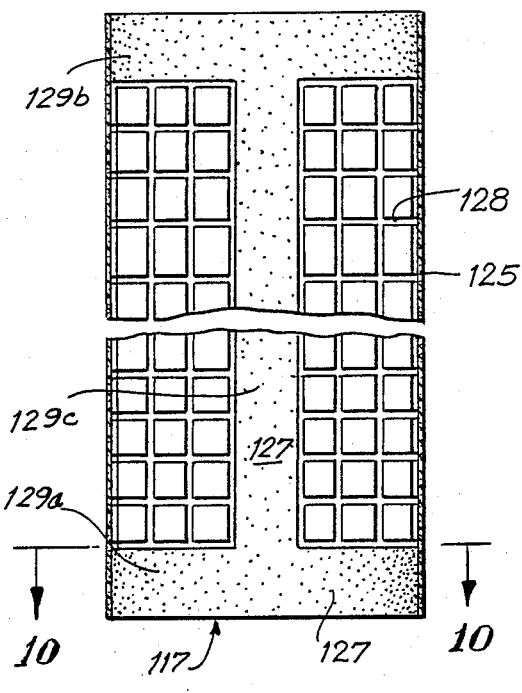
FIG. 9 is a side elevational view of the inner cylinder of the apparatus of FIG. 8 with the filter in cross-section.
Figure 10:
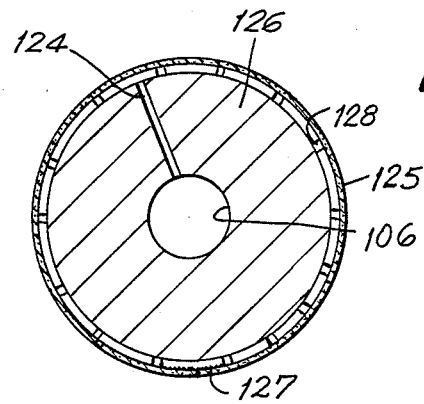
FIG. 10 is a cross-sectional view taken along line 10—10 of FIG. 9.

FIGS. 9 and 10 illustrate a membrane 125 which is wrapped around an inner cylinder 117 to be used in the apparatus of FIG. 8 and held in place by an adhesive material 127. Adhesive material 127 is applied by transfer tape, glue stick or other applicator method between the peripheral regions of membrane 125 and cylinder 117. Consequently, adhesive material 127 forms a barrier between the feed liquid and the permeate liquid referred to earlier.

Inner cylinder 117 has smooth upper and lower surface areas 129a and 129b, which are free of a grid 128, for application of the adhesive material and engagement by the side peripheral regions of a sheet of membrane material 125. Further, inner cylinder 117 has a smooth longitudinally extending surface area 129c for application of adhesive material 127 and engagement by the end peripheral regions of a sheet of membrane material 125. The ends of the sheet are preferably abutting over surface area 129c of inner cylinder 117. The membrane may be drawn tightly or loosely over inner cylinder 117 but the sealing engagement of the peripheral region of membrane 125 with flat surfaces 129a, b and c insure separation of feed liquid and permeate. The rest of the surface of inner cylinder 117 may be provided with grid 128. This arrangement permits easy, sure and rapid mounting of a membrane on the cylinder and the replacement thereof.

Figure 11:
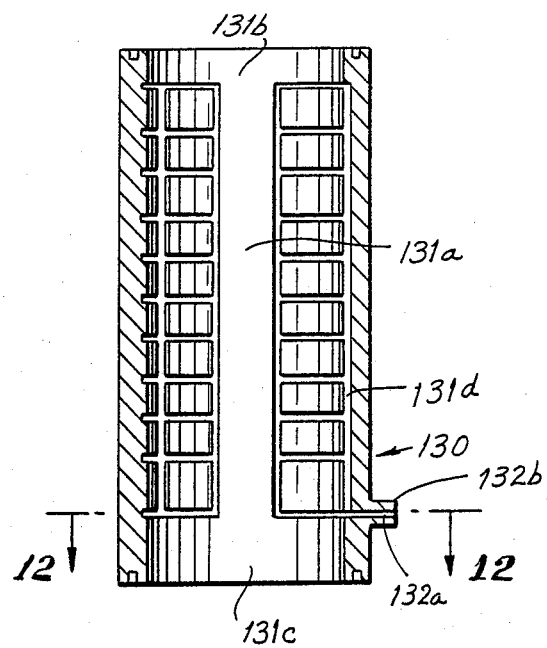
FIG. 11 is a side elevational view in cross-section of another embodiment of the outer cylinder in accordance with the apparatus of FIG. 8.
Figure 12:
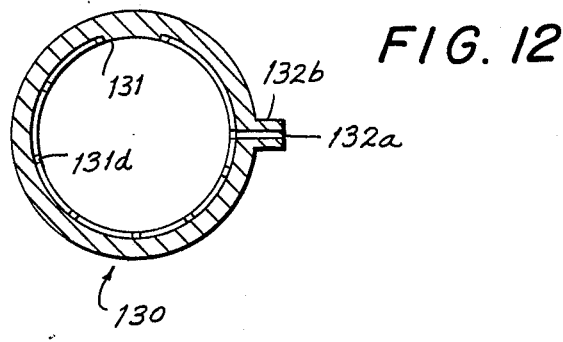
FIG. 12 is a cross-sectional view taken along line 12—12 of FIG. 11.

Referring now to FIGS. 11 and 12, an outer cylinder 130 may also have a membrane (not shown) applied on the inside surface of outer cylinder 130 with the membrane surface facing toward inner cylinder 117. Outer cylinder 130 also has smooth imperforate surface areas on its inner surface for application of the adhesive material, including a smooth, longitudinal surface 131a which connects two circumferential smooth areas 131b and 131c at opposite ends thereof. The remaining surface area of outer cylinder 130 is formed with a grid of narrow interconnecting channels 131d for the purpose of collecting permeate. Channels 131d lead to not less than one hole 132a through the wall of outer cylinder 130. Hole 132a terminates in a nozzle 132b to which a tube is coupled to receive permeate.

The apparatus described and illustrated in FIGS. 8–12 can also have two individual membrane components: one attached to the outer surface of an inner cylinder and one attached to the inner surface of an outer cylinder. The two membranes (i.e., the inner and outer membranes) may be constructed from the same material in order to increase, for example, the total effective membrane material area and thereby the total transmembrane flow. Alternatively, the two membranes may be of different composition and/or structure in order to permit separation of different feed substances, wherein each membrane acts somewhat differently toward substances dissolved or suspended within the feed stream.

For example, the difference between the two membranes may be such that one is hydrophobic and the other hydrophilic; or one may be positively charged (e.g., fixed or adherent chemical, cationic charged groups) while the other may be negatively charged (e.g., fixed or adherent chemical, anionic charged groups); or one membrane may contain certain fixed or adherent structures of a bio-affinity type differing from those of the other membrane. Also, compound separation principles may be employed including the utilization of pore size exclusion.

Additionally, one can take advantage of the inherent centrifugation effect of the apparatus. Where the feed stream contains substances of differing densities, lighter, less dense materials would tend to be concentrated and then filtered preferentially by the inner membrane (i.e., the membrane at the outer surface of the inner cylinder), while more dense materials would tend to be concentrated and filtered by the outer membrane (i.e., the membrane attached to the inner surface of the outer cylinder) during operation.

In the specific use of emulsion separations (e.g., oil droplets—micelles in water), one can take advantage of the difference in density between oil and water, the hydrophobic nature of the oil, and the ionic nature of the micelle surface.

Apparatus 104 of FIG. 8 can also be converted into a small volume separator by either closing inlet 113, replacing inlet 113 with a suitable plug, or replacing bottom housing 109 with a similar housing not having inlet 113. With inlet 113 closed, plugged or omitted, the feed liquid can be supplied through outlet 112. The feed liquid concentrate is not recirculated and may be pressurized directly by a suitable gas.

Figure 13:
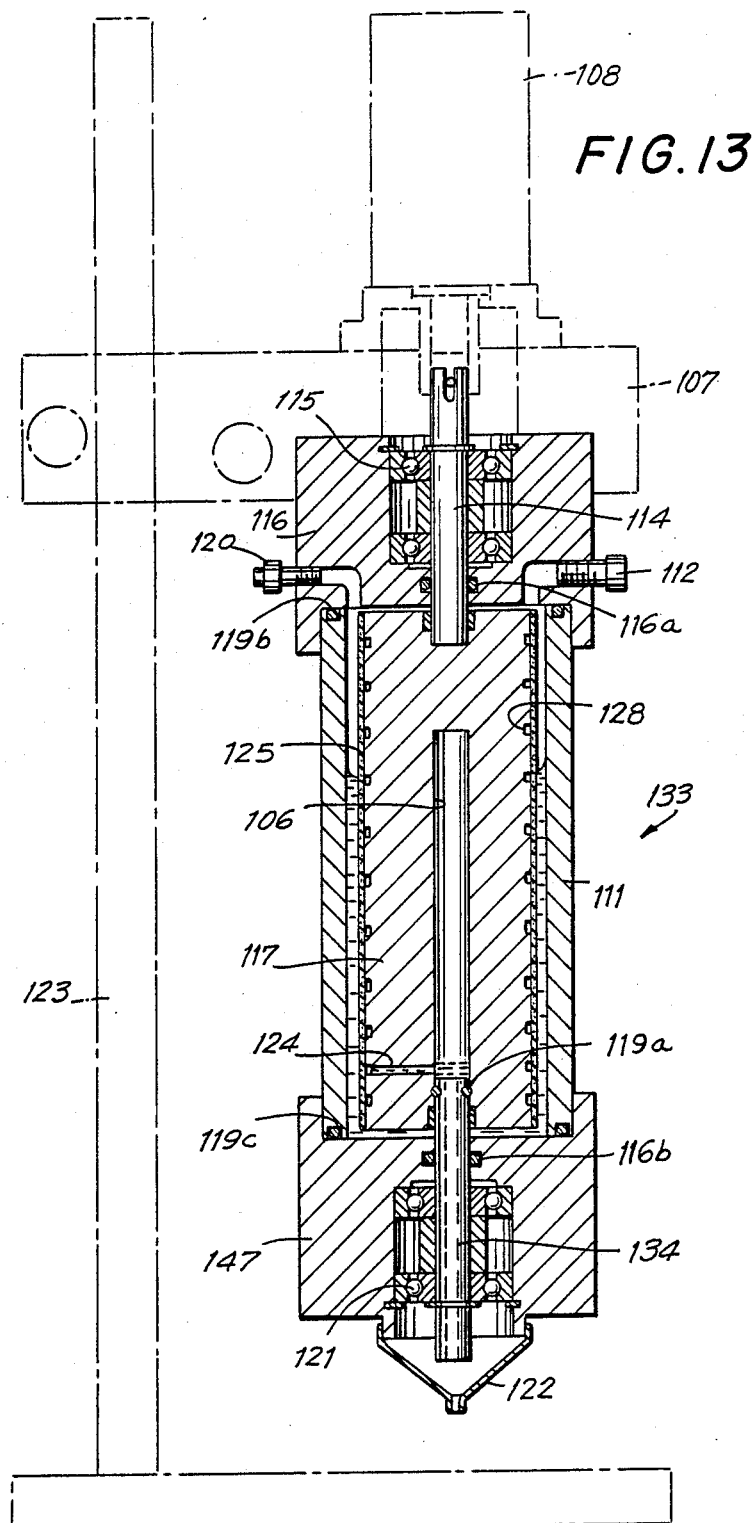
FIG. 13 is a side elevational view in cross-section of a third embodiment for carrying out the invention, particularly adapted for limited volume separation.

A third embodiment of the apparatus in accordance with the invention is depicted in FIG. 13, like reference numerals being applied to like elements to those found in FIG. 8. Apparatus 133, a (limited) volume separator, differs from the embodiments of FIG. 8 only in the construction of lower housing 147 which does not include the inlet 113 of FIG. 8. Rather, the feed liquid is inserted through outlet 112 and, if desired, a pressurizing gas may also be applied through said outlet.

Transmembrane flow in the apparatus depicted in FIG. 13 occurs as described earlier. In operation, part of the membrane may remain in contact with the pressurized feed liquid while the other part of the membrane will be in contact with the pressurized gas. If the apparatus is positioned in a vertical orientation so that the pressurized gas is above the feed liquid level, contact between the gas and an effective membrane area will produce an insignificant amount of transmembrane gas flow. Consequently, the separation process may be carried out until the feed liquid level approaches the lower edge of the effective membrane surface area.

Figure 14:
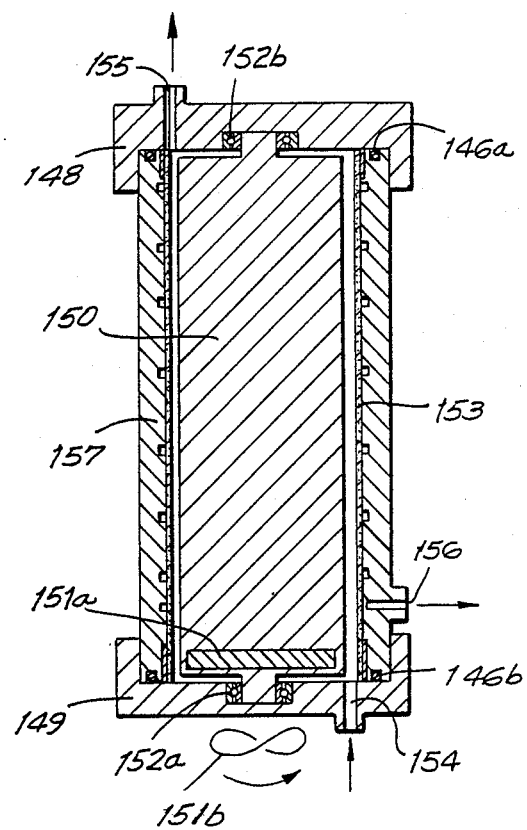
FIG. 14 is a partial side elevational view in cross-section of a fourth embodiment of the invention having a magnetic drive.

If in an apparatus of the type of FIG. 8, a membrane is only applied to the inner surface of the outer cylinder (as opposed to application of a second membrane to the outer surface of an inner cylinder), the apparatus, as FIG. 14 illustrates, can utilize a magnetic drive shown schematically at 151a and 151b. This, in turn, eliminates the need for dynamic seals.

In FIG. 14, outer cylinder 157 with a membrane 153 applied thereon is held between an upper cap 148 and a lower cap 149. A solid inner cylinder 150 is rotated by means of magnetic drive 151b acting upon magnetic element 151a carried by said inner cylinder 150. Inert, low friction bearings 152a and 152b permit rotation of inner cylinder 150 at minimum expenditure of energy. Pressurized feed liquid is recirculated through openings 154 and 155, while permeate is withdrawn through opening 156. Static seals 146a and b provide seals between outer cylinder 157 and caps 148 and 149.

Figure 15:
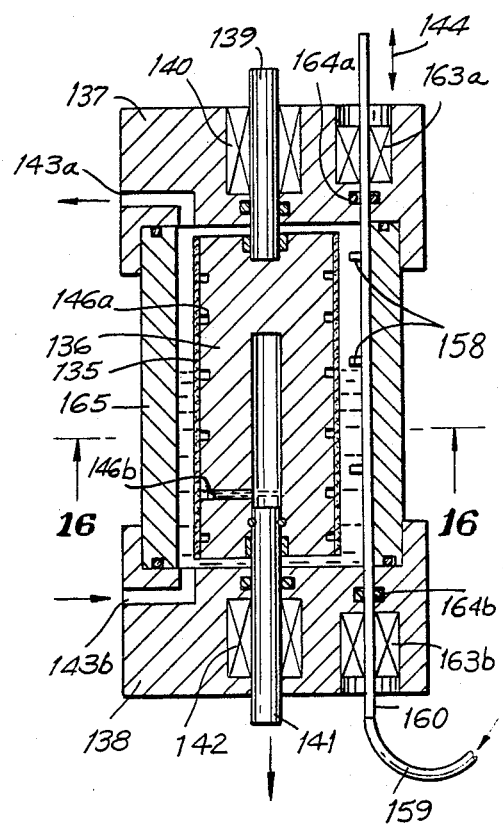
FIG. 15 is a partial side elevational view of a fifth embodiment of the invention in cross-section, having a membrane cleaning system.
Figure 16:
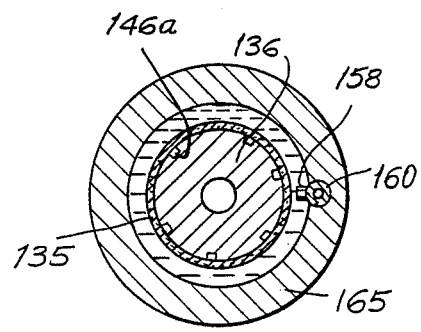
FIG. 16 is a cross-sectional view taken along line 16—16 of FIG. 15.

FIGS. 15 and 16 illustrate a system for cleaning the membrane at the outer surface of an inner rotating cylinder using a jet stream. The system includes an apparatus similar to that illustrated in FIG. 8, but having a jet spraying component consisting of jet nozzles 158 positioned near a membrane 135 of an inner rotating cylinder 136. While jet nozzles 158 are shown, a single jet nozzle may be used.

An outer cylinder 165 is retained between an upper housing 137 and a lower housing 138. Inner cylinder 136 is supported in an upper shaft 139 which rotates in bearings 140 and in a lower hollow shaft 141 which rotates in bearings 142. Upper housing 137 is formed with an outlet 143a, while lower housing 138 is formed with an inlet 143b.

Jet nozzles 158 are positioned perpendicular to or, at a minimum, angled towards the membrane surface. It is a feature of the system that because the membrane rotates due to rotation of the inner cylinder and the jet spraying system is moved up and down, it is possible to clean the whole surface of the membrane with one or more jets.

Specifically, the jet spraying system includes a flexible tube 159 connected to a rigid tube 160 which runs vertically in the space between outer cylinder 165 and inner cylinder 136. Tube 160 is closed at an end thereof and supports and is connected to at least one jet 158. Alternatively, tube 160 may be connected to a member for recirculating fluid and returning the fluid to tube 159. The fluid used for cleaning has a pressure higher than the pressurized feed liquid and enters the system through flexible tube 159, and flows through tube 160 and finally into jets 158. Fluid used for cleaning may include the feed fluid, the permeate, or special fluid.

In order for the jet spraying system to move vertically, tube 160 is journaled through upper and lower housings 137 and 138 and supported by reciprocal bearings 163a and 163b. Reciprocal seals 164a and 164b prevent leagage of the pressurized feed solution. Tube 160 is reciprocally displaced in the direction of arrows 144 by a means not shown. Permeate flows in grooves 146a and hole 146b in the same manner as in the embodiment of FIG. 8.

Referring now to FIG. 17, a mini device in accordance with the present invention for providing a membrane-based separation apparatus for processing small volumes of liquid, is disclosed. By way of example, the mini device of FIG. 17 may be used to separate a liquid into a permeate and a retentate (concentrate), when said liquid is a small volume liquid sample as found in clinical laboratories (e.g., blood samples, blood plasma, urine sample, etc.). It may also be employed for other small volume liquid samples as occur in research and analytical laboratories.

In FIG. 13, an apparatus is depicted for processing small volumes of liquid without recirculation such that small volumes of liquid can be filtered by a membrane while maintaining suitable fluid dynamic conditions. The holdup (dead) volume in that apparatus is the volume of liquid required to fill the apparatus from the lower dynamic seal up to the level of the lower end of the effective membrane area. In the FIG. 13 apparatus, the materials of the lower dynamic seal and the lower hollow shaft represent a constraint on the types of possible separations which may be achieved. For example, an ethylenepropylene O-ring used as the lower dynamic seal 116b of FIG. 13 has poor resistance to fatty acids.

In the preferred embodiment of FIG. 17, the holdup (dead) volume is decreased and the lower dynamic seal and the lower hollow shaft are eliminated. As illustrated, the mini device of FIG. 17 permits the permeate to be collected inside of the inner hollow cylinder. The permeate, instead of being removed from a hollow inner cylinder continuously through the hollow bottom shaft as taught by the embodiment of FIG. 13, is retained within the hollow inner cylinder of the device until the termination of the separation process. Thereafter, said cylinder, including its affixed membrane, is removed from the mini device and the collected fluid is removed.

Particular features of the mini device include simple construction, very small holdup (dead) volume, only one dynamic seal out of contact with the process liquid, reduced risk of foreign body contamination of the process fluid and ease of device operation.

As illustrated in FIG. 17, the mini device 166 includes a drive means, which may be direct or indirect, in this case an electrical, magnetic or air driven motor 172, attached to a stationary upper housing 167. The stationary portions of the apparatus are upper housing 167, a lower housing 168, a cap 169 and an outer cylinder 170 supported between housing 167 and housing 168. A shaft 171, formed with a passageway 171' which is vented to the atmosphere, is coupled to a motor 172 and rotatably supported in housing 167 by means of bearings 173. An inner cylinder 174 with a membrane 185 thereon is supported on shaft 171. Inner cylinder 174 has its surface covered by a grid of narrow interconnecting, shallow channels 175 coupled to an inner chamber 176, by at least one hole radially extending to 175'. A membrane 185, originally constructed as a flat sheet, is wrapped around and secured to inner cylinder 174 in the manner described above. Membrane 185 may also be in the form of a seamless sleeve for fitting around inner cylinder 174.

Permeate 180 which has passed through the membrane, flows through channels 175 into inner chamber 176. The feed liquid 181, which is placed between inner cylinder 174 and outer cylinder 170, is pressurized by means of a suitable gas supplied through an inlet 177. A dynamic seal 178 between upper housing 167 and rotating hollow shaft 171 prevents any sizeable leakage of pressurized gas supplied through inlet 177. An O-ring 179 provides a seal between shaft 171 and cylinder 174.

The pressure inside hollow cylinder 174 is preferably kept equal to atmospheric pressure since shaft 171 is hollow, with its upper end exposed to the atmosphere.

Accumulated permeate is retained within the inner chamber of cylinder 174 until completion of the separation process. Thereafter, inner cylinder 174 is disconnected from shaft 171. The permeate as well as the retentate (concentrate) is then recovered. Shaft 171 permits recovery of the permeate during the separation process since it is formed with a passageway 171'.

In a further embodiment shown in FIG. 18, like referred numerals being applied to like elements of FIG. 17, an inner cylinder 186 of a mini-device is rotated by a magnetic device 189. A magnetic element 187, supported on inner cylinder 186, is rotated by magnetic coupling with a magnetic drive device 189. Since the diameter of hollow shaft 183 is small, the friction in a dynamic seal 184 along the side of shaft 183 is reduced and easily overcome by the magnetic drive.

For each apparatus disclosed in FIGS. 8–18, the pressure differential between the feed stream and the permeate was used as the driving force for transmembrane flow. Pressure differential is generated typically by an applied pressure, preferably from a pump or pressurized gas, upon the feed liquid, but also can be generated partly or exclusively by a vacuum applied to the permeate stream.

Figure 19:
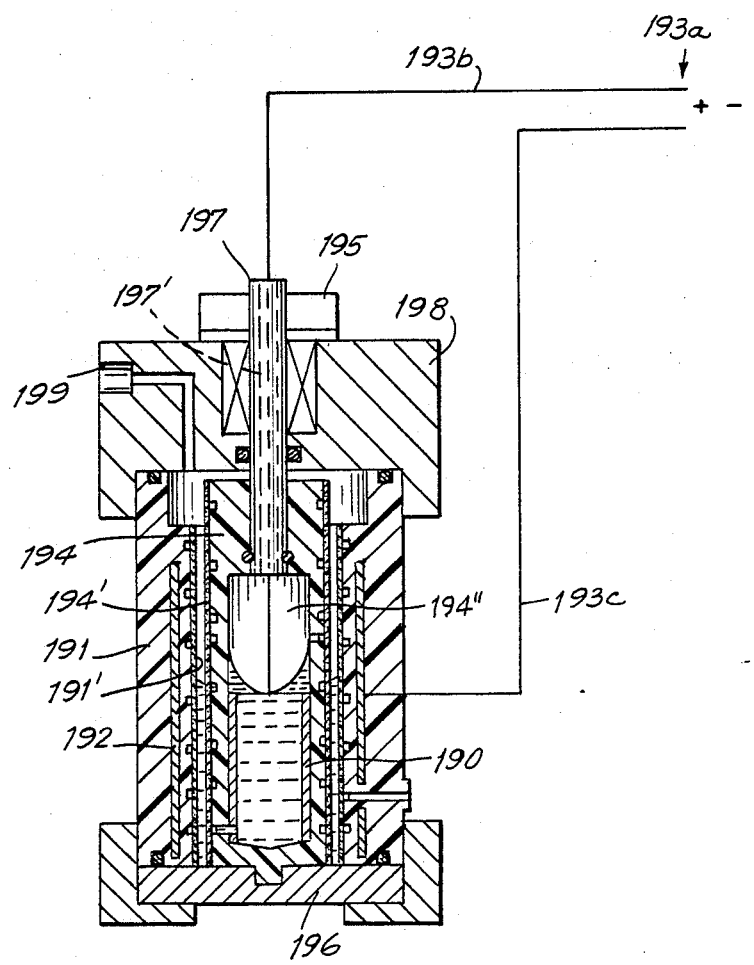
FIG. 19 is a side elevational view in cross-section of a seventh embodiment of the invention, having an applied electric field for generating transmembrane flow.

Referring now to FIG. 19, an apparatus in accordance with the invention is described which employs an electric field as the primary or additional force for generating a transmembrane permeate flow across at least one of membranes 194' and 191' attached respectively to an inner cylinder 194 and an outer cylinder 191. Inner cylinder 194 houses a cylindrical inner electrode 190 mounted in inner chamber 194", while outer cylinder 191 houses an outer cylindrical electrode 192. Electrodes 190 and 192 are connected to a suitable external electric field source 193a by leads 193b and c, respectively. The apparatus includes an upper housing 198 and a lower housing 196 which together support outer cylinder 191. Housing 198 has an inlet 199 for pressurizing feed liquid.

Inner cylinder 194 with a suitable membrane thereon has a shaft 197 inserted therein formed with a passageway 197' therethrough for venting. Both inner cylinder 194 and shaft 197 are rotated by rotating means 195. If outer cylinder 191 also has a membrane 191' thereon, and electrode 190 cannot be imbedded in the outer cylinder as shown, then the area between the outer electrode and the backside of the outer membrane should be made of electro-conducting matter such as a suitable electrolyte solution, metal, or electro-conducting polymer. Additionally, at the start of operation, a limited amount of electro-conduction material, as electrolyte solution, may be placed within inner cylinder 194 for making contact with inner electrode 190.

Reference is now made to FIGS. 20–23, which illustrate additional embodiments of the invention for providing in situ separations and analyses.

In use, conventional in situ devices often encounter difficulties in obtaining continuous analytical data about parent fluids. Often, these parent fluids are crude process streams containing suspended solids, particulate matter and other substances, which interfere with physical and chemical fluid measurements and measuring devices.

The usual practice to circumvent such interference is to remove offending substances by suitable separation techniques in order to obtain a "testable" fluid. Conventional techniques for separation such as centrifugation and chromatography are time consuming and discontinuous. Often, the parent fluid must also be treated with clarifying agents, precipitants, emulsifiers, solubilizers, antifoaming agents and the like which can interfere with fluid measurements or contaminate the parent fluid.

In principle, the ideal separation system would be capable of acting in a continuous fashion, thus generating a continuous supply of testable samples. Membrane filtration would seem to be the most versatile separatory technique were it not that membranes tend to become fouled or clogged by a wide variety of substances. Moreover, continuous operation is not practical since intermittent cleaning is required. Such fouling, not only interferes with sample production by decreasing transmembrane flow, but more importantly tends to alter the quality of the permeate, thus undoing the primary objective of the process. Thus, commonly practiced membrane separation techniques cannot be used continuously to produce acceptable and useable testable fluid.

In contrast, membrane filtration is achieved in situ in the apparatus in accordance with the invention disclosed in FIGS. 20–23 by obtaining continuously a permeate in order to provide suitable fluid for analysis, or if desired, by simply obtaining a sample of permeate in a discontinuous, short time separation. No separate concentrate stream is collected. In effect, the only fluid loss to the parent fluid is that of the permeate transmembrane flow. The unique fluid dynamics of the separatory system minimize typical interfering phenomena associated with membrane filters such as fouling and concentration polarization. The apparatus in accordance with the invention also allows for in situ sampling and analysis by simply immersing the apparatus for a short time in the parent fluid, e.g., water sampling and analysis in contaminated sites.

As before, the apparatus may take advantage of the fluid dynamic referred to as Taylor vortices in which toroidal-like counter rotational vortices are created in the space between an outer stationary cylinder and an inner rotating cylinder.

Transmembrane flow is created by one or a combination of driving forces across the membrane interface including pressure differential, electric field, and inherent concentration gradient.

Another important feature of the device is the flexibility of separation. The composition of the permeate can be controlled not only by the nature of the membrane and the magnitude of the driving force, but also by the specific conditions of the separation such as the size of the gap between the cylinder, the diameter of the inner cylinder and the rotational speed of the inner cylinder. These parameters determine not only the Taylor vortices, but also determine the shear stress on the surface of the membrane.

Besides membrane separation in which a volume of permeate is involved, the principle of spinning an inner cylinder in the stationary outer cylinder, whereby said inner and outer cylinder are submerged in the parent fluid, can be used for different applications, including ion detection (e.g., chloride probe, pH probe) oxygen detection, etc. in form of spinning an inner cylinder within a stationary outer cylinder, whereby signals of electrical nature are obtained free from the interfering particle matter.

Figure 20:
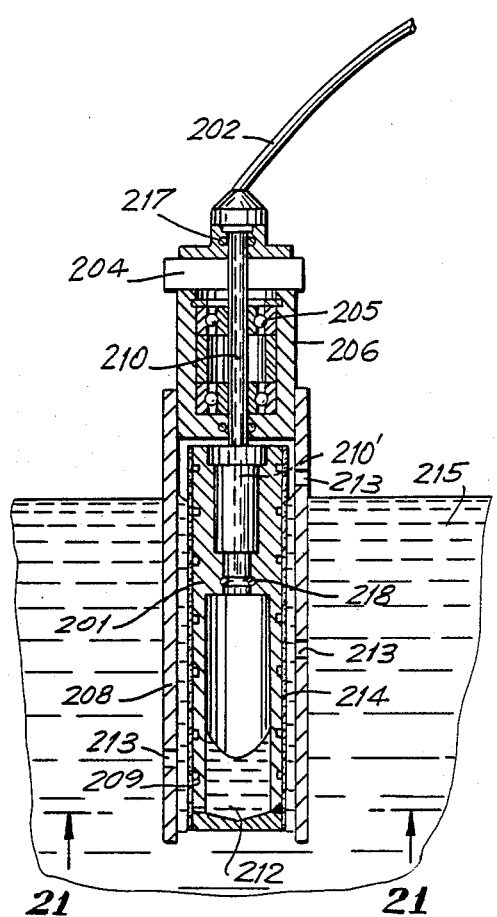
FIG. 20 is a side elevational view in cross-section of a eighth embodiment of the invention for in situ separation.
Figure 21:
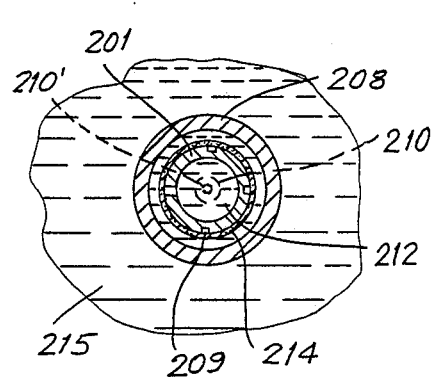
FIG. 21 is a cross-sectional view taken along line 21—21 of FIG. 20.

Referring to FIGS. 20–21, the apparatus in accordance with the invention consists of an inner rotatable cylinder 201 with a semipermeable membrane wrapped along its longitudinal surface, connected to a driving shaft 210. Drive shaft 210 is provided with a passageway 210' coupled to a vacuum source by a tube 202 which extends from the upper region of the driving shaft. Driving shaft 210 is contained within a housing 206 by means of bearings 205. A rotating means 204 is positioned in housing 206 and is connected to driving shaft 210 for rotation thereof. A vacuum condition is maintained in shaft 210 by means of gasket 217.

If both vacuum and pressure outlets of a suitable vacuum pump are used, the same vacuum pump may supply the vacuum driving force across the membrane interface while rotating inner cylinder 201 by means of a suitable air-driven motor 204 supported on housing 206. Inner cylinder 201 may also be rotated by means of a suitable flexible drive or other means, direct or indirect, electrical or magnetic.

An outer stationary cylinder 208 is positioned concentric with and spaced away from inner rotating cylinder 201. It is also acceptable for inner cylinder 201 to be eccentric with outer cylinder 208. It is possible, by way of example, for said inner and/or said outer cylinders to also be formed in a conical shape. A filter membrane 214 is mounted in inner cylinder 201. A membrane may also be attached to the inner surface of the stationary outer cylinder as taught earlier.

Outer stationary cylinder 208 can have walls of solid construction, but its walls may also be perforated or slotted by at least one hole and/or slot 213 in order to establish better recirculation and mixing between parent fluid 215 and the fluid in the gap between the inner and outer cylinders.

If the parent fluid is pressurized as in many chemical, biochemical and fermentation reactors, transmembrane permeate flow is created by using the pressure difference between the pressurized parent fluid and the permeate collected.

Transmembrane permeate flow is collected within interconnected narrow channels 209 on the surface of inner cylinder 201. The permeate passes through at least one hole perforating cylinder 201 into a suitable collector chamber 212, from which it may be drawn continuously or intermittently.

Besides pressure differential for transmembrane fluid flow, other driving forces may be employed. One is creating an electromotive force by placing electrodes in the inner and outer cylinders, respectively. Also, a driving force may be created by using concentration gradients between the permeate and parent fluid solutes.

The apparatus in accordance with the invention can be used for separations where the volume of parent fluid is limited. The device is simply submerged in a container of the parent fluid 215. Separation of the parent fluid into a permeate and a parent fluid concentrate is consequently obtained. The advantage of this mode of operation is that no external means of recirculation of fluid is required. Also, parent fluid 215 may remain in the original container.

If the parent fluid container is in a certain form, particularly in the shape of an Ehrlenmeyer flask or test tube, the device may be constructed without an outer cylinder. The walls of the parent fluid container may be used instead of the outer cylinder wall, so long as sufficient space is provided between the rotating inner cylinder and the wall of the parent fluid container. Alternatively, a kit of interchangeable outer and/or inner cylinders of different diameters may be constructed.

For certain uses, depending upon the type membrane, it may not be necessary to reach a Taylor number of 40. If, by way of example, the parent fluid is very dilute and non-viscous and the membrane is only slightly permeable, it may not be necessary to establish Taylor vortices.

Additionally, when the distance between the inner and outer cylinders becomes very small, the Taylor number may be 40 or less even if the inner cylinder is rotating at high speed. Nonetheless, effective separation can be obtained. This is partially explained by the high shear rate on the surface of the membrane. This is especially true if the shear stress is combined with the effect of parent fluid slipping on the surface of the membrane, which itself is dependent upon the nature of the parent fluid, the membrane, and the magnitude of the shear stress.

Figure 22:
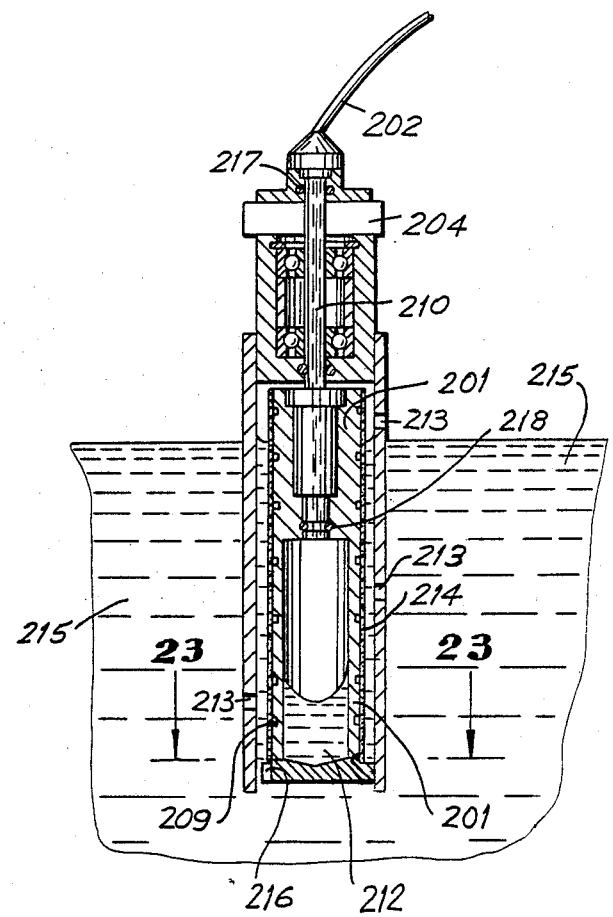
FIG. 22 is a side elevational view in cross-section of the apparatus of FIG. 20 having a propeller means for enhancing recirculation.
Figure 23:
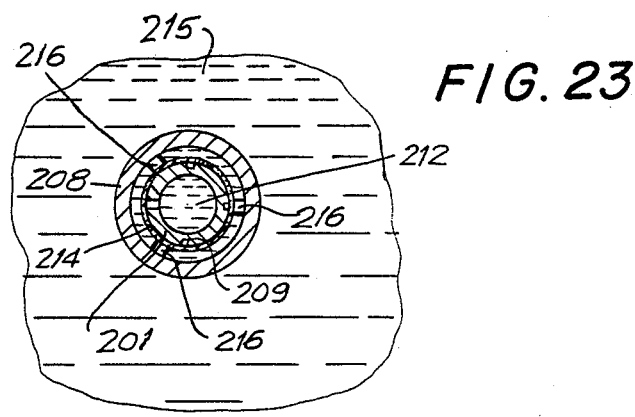
FIG. 23 is a cross-sectional view taken along line 23—23 of FIG. 22.

Referring now to FIGS. 22 and 23, like referred numerals being assigned to like elements to those depicted in FIGS. 20-21, in order to enhance recirculation of parent fluid in the bulk and in the gap between the inner and outer cylinders, a recirculation propeller 216 can be used. Propeller 216 is attached to the bottom of the rotating cylinder 201. The rotation of propeller 216 creates recirculation of parent fluid in the bulk and in the gap between the cylinders. Propeller 216 may also serve as a stabilizer for the bottom of the rotating inner cylinder, preventing excessive wobbling of the inner cylinder in the gap between the inner and outer cylinders. It is particularly important where the inner cylinder 201 is flexibly attached to drive shaft 210 by a static "O" ring 218, isolating permeate 212 within inner cylinder 201 from the parent fluid.

The device of FIGS. 20-23 can be submerged into parent fluid fully, partially, vertically, horizontally, upside down, or at any suitable angle so long as it is sealed sufficiently. The apparatus is particularly adaptable for in situ separations in systems where immediate extraction of permeates is necessary.

The method and apparatus described in FIGS. 20-23 can be used not only for obtaining permeate fluid but also for releasing required solute and/or solvent into the parent fluid by releasing fluid which contains the solute and/or solvent into tube 202 and therefore into the inner rotating cylinder.

Such solute or solvent is released into the parent fluid through a membrane placed on the outside of the inner cylinder, thereby taking advantage of the system's driving force, its centrifugal effect, its density differential, or its concentration difference. The advantage of this method is that the membrane in contact with parent fluid can be kept unfouled for any time period, insuring uninterrupted and controlled release of the solute and/or solvent into the parent fluid. As taught above, the membrane may also be attached to the inner surface of the stationary outer cylinder.

By eliminating the membrane attached to the outer surface of the inner cylinder of the apparatus described, an improved device for mixing parent fluid is provided.

The most common type of a mixing device is referred to as a stirred tank reactor. Usually, it is a vessel which contains parent fluid being intensely mixed by at least one impeller. Examples include polymerization tanks, fermenters, crystallizers, and enzyme reactors. Stirred tank reactors may be a batch type, in which there is no continuous feed stream supplied and no product stream withdrawn from the reactor; or, it can be a current-flow, stirred tank reactor, which is actually a batch reactor with continuous feed inlet streams and continuous product outlet streams.

Generally, it is of utmost importance for the parent fluid to be thoroughly and uniformly mixed, because mixing (and, thus, shear and degree of turbulence) is among the main factors determining the rate of fermentation, crystallization, polymerization and coagulation. Besides uniformity of mixing throughout the volume of the reactor, it also is very important to control the magnitude of mixing and in turn the shear and degree of turbulence. For example, during crystallization, more intensive mixing usually results in greater numbers of nucleation crystals, but having a smaller size.

Use of an impeller to mix fluid produces non-uniform mixing and degrees of shear and turbulence in a given volume within a reactor. One major reason is the linear speed of the impeller "blade" increases as the distance from its center increases.

Figure 24:
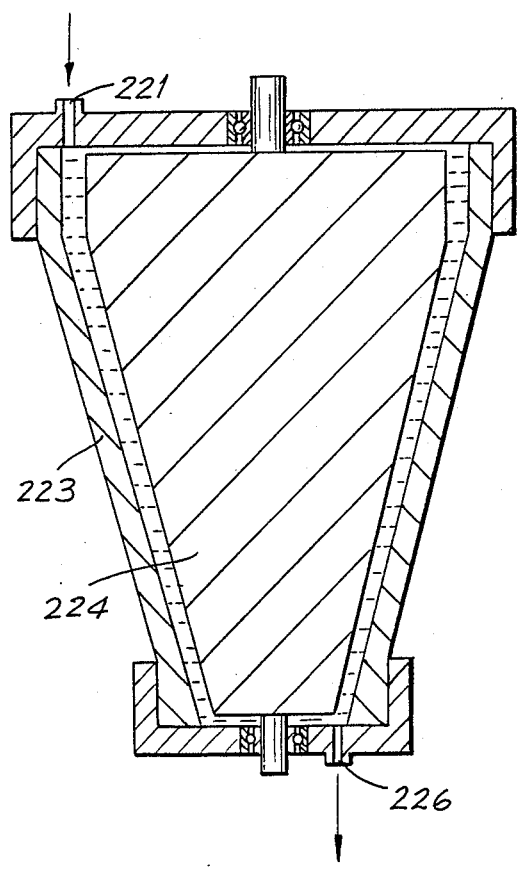
FIG. 24 is a side elevatinal view in cross-section of a mixing reactor in accordance with the invention.

Reference is now made to FIG. 24 which illustrates a device in accordance with invention for thorough uniform mixing of parent fluid whereby said fluid is first placed in the space between a cone shaped inner rotating cylinder 224 and an outer stationary cone shaped cylinder 223. The parent fluid is supplied via an inlet 221. Product fluid is removed via a feed outlet 226. While in the apparatus, the fluid in the form of "spiral coils" moves from feed inlet 221 to feed outlet 226. Simultaneously, the spiral coils are rotated around their own axes (Taylor vortices), thus insuring uniform mixing, shear and degree of turbulence.

The apparatus can also be used as a batch type reactor, wherein all of the parent fluid is maintained within the reactor until the end of the process by closing feed outlet 226.

By appropriate selection of independent parameters including the radius of the inner cylinder, the speed of rotation, the distance between inner and outer cylinders, and the "residence" time of the feed fluid in the reactor, the magnitude of mixing can be established and controlled. For example, during crystallization, nucleation processes require high degrees of mixing at first so that critical size nuclei can be formed. Thereafter, the degree of mixing is reduced in order to obtain sizeable crystals. Unfortunately, crystallization in a tank reactor with a stirring impeller results in a very broad size distribution of the crystals, rather than uniform size distribution. When the device, as illustrated by FIG. 24, is used for, say, crystallization, and the inner cylinder has the form of a cone, then the fluid is supplied to the intensive mixing zone (i.e., wide diameter of the cone), and the mixing is reduced as the parent fluid is moved toward an outlet 226. Because of the reduction in the diameter of the rotating cone, such process produces uniform, reproducible crystals in a continuous operation.

The apparatus is also useful in countercurrent chromatography, wherein components of mixtures are partitioned between stationary and mobile liquid phases. For example, a multilayer coil machine containing a coiled column rotating about its own axis and simultaneously revolving about a second axis produces a complex centrifugal effect. This centrifugal effect results in separation of liquid phases by density into alternating zones of intense mixing and quiescent separation. In the apparatus of FIG. 24, a complex centrifugal field is obtained by means of rotating inner cylinder 224 and rotating Taylor vortices. Consequently, the axes of rotation are perpendicular to one another. In the coil column machine cited above, in contrast, the axes are parallel.

As compared with existing centrifugation models, the present apparatus is inherently much simpler and easier to operate, and does not require any separate coiled columns since Taylor vortices appear naturally in operation.

The apparatus of FIG. 24 can be used with a membrane placed along the outer surface of the inner cylinder or along the inner surface of the outer cylinder for simultaneous product removal of fluid present in the space between the inner and outer cylinder.

It is understood that all the devices described in the accompanying drawings are applicable to any filtration method in which a spinning surface is employed. These include ultrafiltration, micofiltration, reverse osmosis, pervaporation, dialysis, electrodialysis and water splitting. They are also applicable to systems employing plural rotating cylinders and plural stationary cylinders.

Additionally, it is understood that the rotatable inner cylinder may be constructed of a porous material such as glass, ceramic, sintered metal or an organic substance which may effectively operate to filter.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of filtration of fluid samples comprising:
   feeding a fluid sample into a gap between a stationary outer body and a rotatable inner body by immersing at least a lower portion of the outer body in a body of the fluid, the lower region of the gap being at least in part open for the passage of fluid into the gap, at least a portion of the outer surface of at least one of the inner and outer bodies which faces the gap comprising a filter for the passage of permeate from fluid in the gap;
   rotating the inner body at a rate which establishes a Taylor number ($T_a$) greater than about 40 in at least a substantial portion of the fluid in the gap;
   causing permeate to flow through the filter from the gap; and
   collecting permeate from the surface of the filter which faces away from the gap.

2. The method of claim 1 wherein the step of causing flow of the permeate through the filter is effected by creating one of a pressure differential, a concentration differential, and an electric field differential across the filter.

3. The method of filtration of claim 1 wherein the filter comprises a semipermeable membrane.

4. The method of filtration of claim 1 wherein the inner body supports a propeller means for rotation therewith at a lower region of the gap.

5. In combination:
   (A) a liquid; and
   (B) a device for producing a sample of the liquid free from any suspended solids, particulate matter, or other substances that might be present in the liquid and that are not desired to be in the sample, said device comprising:

(1) a rotor member having an essentially cylindrical or conical outer wall and a longitudinal central axis of rotation;

(2) a housing with an essentially cylindrical or conical cavity defined by an essentially cylindrical or conical inner wall larger in diameter than the rotor member, the rotor member being rotatably connected to the housing and being at least partially within the cylindrical or conical cavity, the cavity having a longitudinal axis substantially parallel to the longitudinal axis of the rotor member, the essentially cylindrical or conical inner wall corresponding to and being closely spaced from the corresponding portion of the cylindrical or conical outer wall of the rotor member to define an essentially cylindrical or conical narrow gap between said inner and outer walls;

(3) a filter that allows permeate to pass through it mounted on the cylindrical or conical outer wall of the rotor member or on the cylindrical or conical inner wall of the housing;

(4) entry means in the housing to allow liquid to enter the gap; and (5) means to rotate the rotor member;

(C) the housing being at least partially immersed in the liquid so that the liquid can flow into the gap via the entry means, the liquid at least partially filling the gap.

6. The combination of claim 5 further comprising means to rotate the rotor member to give a calculated Taylor number for the liquid in the gap greater than 40.

7. The combination of claim 5 further comprising means to withdraw permeate from the device.

8. The combination of claim 5 wherein the filter is a membrane.

9. The combination of claim 5 wherein the longitudinal axis of the rotor member and the longitudinal axis of the cylindrical or conical cavity in the housing lie along the same line.

10. The combination of claim 5 further comprising exit means in the housing to allow liquid to leave the gap wherein the entry means for liquid inflow and the exit means for liquid outflow are separate openings in the housing of the device.

11. The combination of claim 5 further comprising propeller means connected to the rotor member.

12. The combination of claim 5 further comprising means for causing flow of permeate across the filter by a pressure differential, an electric field, a concentration gradient, or a combination thereof.

13. The combination of claim 5 or 6 further comprising means for physically or chemically testing liquid of the device.

14. The combination of claim 13 wherein the liquid is the permeate.

15. The combination of claim 13 wherein the testing means is ion detection means to detect the presence of an ion.

16. The combination of claim 15 wherein the ion detection means is chloride ion detection means.

17. The combination of claim 15 wherein the ion detection means is hydrogen ion detection means.

18. The combination of claim 13 wherein the testing means is oxygen detection means to detect the presence of oxygen.

19. In combination:

(A) a vessel containing a liquid to be sampled; and (B) a sampling device for producing a sample of the liquid free from any suspended solids, particulate matter, or other substances that might be present in the liquid and that are not desired to be in the sample, said device comprising:

(1) a rotor member having an essentially cylindrical or conical outer wall and a longitudinal central axis of rotation;

(2) a housing with an essentially cylindrical or conical cavity defined by an essentially cylindrical or conical inner wall larger in diameter than the rotor member, the rotor member being rotatably connected to the housing and being within the cylindrical or conical cavity, the cavity having a longitudinal axis substantially parallel to the longitudinal axis of the rotor member, the essentially cylindrical or conical inner wall corresponding to and being closely spaced from the corresponding portion of the cylindrical or conical outer wall of the rotor member to define an essentially cylindrical or conical narrow gap between said inner and outer walls;

(3) a filter that allows permeate to pass through it mounted on the cylindrical or conical outer wall of the rotor member or on the cylindrical or conical inner wall of the housing;

(4) entry means in the housing to allow liquid to enter the gap; and (5) means to rotate the rotor member;

(C) the housing of the sampling device being at least partially immersed in the vessel so that the liquid to be sampled can flow from the vessel outside the housing into the gap via the entry means, the liquid at least partially filling the gap.

20. The combination of claim 19 further comprising means to rotate the rotor member to give a calculated Taylor number for the liquid in the gap greater than 40.

21. The combination of claim 19 or 20 further comprising means to withdraw permeate from the device.

22. The combination of claim 19 or 20 wherein the filter is a membrane.

23. The combination of claim 19 or 20 further comprising exit means in the housing to allow liquid to leave the gap wherein the entry means for liquid inflow and the exit means for liquid outflow are separate openings in the housing of the device.

24. The combination of claim 19 or 20 further comprising means for causing flow of permeate across the filter by pressure differential, an electric field, a concentration gradient, or a combination thereof.

25. The combination of claim 19 or 20 further comprising propeller means connected to the rotor member.

26. In combination:

(A) a liquid to be physically or chemically tested, the liquid containing suspended solids, particulate matter, or other substances that might interfere with the testing;

(B) a testing device comprising:

(1) a rotor member having an essentially cylindrical or conical outer wall and a longitudinal axis of rotation;

(2) a housing with an essentially cylindrical or conical cavity defined by an essentially cylindrical or conical inner wall larger in diameter than the rotor member, the rotor member being rotatably connected to the housing and being at least partially within the cylindrical or conical cavity, the cavity having a longitudinal axis substantially parallel to the longitudinal axis of the rotor member, the essentially cylindrical or conical inner wall corresponding to and being closely spaced from the corresponding portion of the cylindrical or conical outer wall of the rotor member to define an essentially cylindrical or conical narrow gap between said inner and outer walls;

(3) entry means in the housing to allow liquid to enter the gap; and (4) means to rotate the rotor member; and (C) means for physically or chemically testing liquid of the device to produce a test signal substantially free from the effects of the suspended solids, particulate matter, or other substances that in the absence of the device might interfere with the testing;

(D) the housing of the testing device being at least partially immersed in the liquid to be tested so that the liquid can flow into the gap via the entry means, the liquid at least partially filling the gap.

27. The combination of claim 26 further comprising means to rotate the rotor member to give a calculated Taylor number for the liquid in the gap greater than 40.

28. The combination of claim 26 wherein the device further comprises a filter mounted on the outer wall of the rotor member, the filter allowing permeate to pass through it from the gap.

29. The combination of claim 28 further comprising means to rotate the rotor member to give a calculated Taylor number for the liquid in the gap greater than 40.

30. The combination of claim 28 further comprising means for causing permeate flow across the filter by a pressure differential, an electric field, a concentration gradient, or a combination thereof.

31. The combination of claim 26 wherein the device further comprises a filter mounted on the inner wall of the housing, the filter allowing permeate to pass through it from the gap.

32. The combination of claim 31 further comprising means to rotate the rotor member to give a calculated Taylor number for the liquid in the gap greater than 40.

33. The combination of claim 31 further comprising means for causing permeate flow across the filter by a pressure differential, an electric field, a concentration gradient, or a combination thereof.

34. The combination of claim 28, 29, 31, or 32 further comprising means to withdraw permeate from the device.

35. The combination of claim 28, 29, 31, or 32 wherein the filter is a membrane.

36. The combination of claim 28, 29, 31, or 32 wherein the liquid being tested is the permeate.

37. The combination of claim 26 or 27 wherein the testing means is ion detection means to detect the presence of an ion.

38. The combination of claim 37 wherein the ion detection means is chloride ion detection means.

39. The combination of claim 37 wherein the ion detection means is hydrogen ion detection means.

40. The combination of claim 26 or 27 wherein the testing means is oxygen detection means to detect the presence of oxygen.

41. An apparatus for in situ filtration of fluid samples, the apparatus comprising:

an inner body rotatable about an axis and having an outer side wall extending in the direction of the axis of rotation of the inner body and spaced from said axis;

a stationary outer body having an inner side wall extending in the direction of the axis of the rotation of the inner body and surrounding and spaced from the outer side wall of the inner body to define a gap for receiving a fluid sample, the gap between the inner and outer bodies having essentially annular cross-section in planes extending essentially perpendicular to the axis of rotation of the inner body, the gap having upper and lower portions as viewed in the direction of the axis of rotation;

at least a portion of the surface of the outer side wall of the inner body which faces the gap defining a filter for passage of permeate from the fluid sample;

means on the inner body for leading permeate away from the filter;

housing means supporting the outer body relative to the rotatable inner body, the housing means closing the upper portion of the gap between the inner and outer bodies, said housing means and inner and outer bodies being shaped to define an essentially circumferentially extending opening to the gap in the lower portion of the gap; and means for rotating the inner body at a rate to establish a Taylor number ($T_a$) greater than 40 in at least a substantial portion of a fluid sample contained in the gap;

whereby when the outer body of the apparatus is at least partially immersed in a fluid to be sampled, the fluid flows through the essentially circumferentially extending opening into the gap for filtration.

42. The apparatus of claim 41 wherein the filter comprises:

a semipermeable sheet membrane;

a support member for supporting a surface of the membrane in facing relation to the gap; and means for collecting permeate from the surface of the membrane which faces away from the gap.

43. The apparatus of claim 42 further comprising:

means coupled to the collecting means for drawing permeate through the membrane and out of the apparatus.

44. The apparatus of claim 41 wherein the surface of the inner body including the sheet membrane and the inner surface of the outer body essentially define cylinders.

45. The apparatus of claim 41 further comprising:

propeller means supported on the inner body at the lower region of the gap.

* * * * *